United States Patent
Lee et al.

(10) Patent No.: US 10,516,891 B2
(45) Date of Patent: Dec. 24, 2019

(54) METHOD AND SYSTEM OF REFERENCE FRAME CACHING FOR VIDEO CODING

(71) Applicant: INTEL CORPORATION, Santa Clara, CA (US)

(72) Inventors: Penne Y Lee, Bellevue, WA (US); Charlie Wang, Bellevue, WA (US); Ning Ivan Luo, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 14/948,125

(22) Filed: Nov. 20, 2015

(65) Prior Publication Data

US 2017/0150159 A1 May 25, 2017

(51) Int. Cl.
    *H04N 19/52*    (2014.01)
    *H04N 19/423*   (2014.01)

(52) U.S. Cl.
    CPC ........... *H04N 19/423* (2014.11); *H04N 19/52* (2014.11)

(58) Field of Classification Search
    CPC .............................. H04N 19/423; H04N 19/52
    USPC ..................................................... 375/240.16
    See application file for complete search history.

(56) References Cited

U.S. PATENT DOCUMENTS

| | | | |
|---|---|---|---|
| 8,526,489 B2 | 9/2013 | Narasimhan et al. | |
| 8,634,413 B2 * | 1/2014 | Lin | H04N 19/172 370/389 |
| 9,122,609 B2 * | 9/2015 | Budagavi | G06F 12/0844 |
| 9,148,670 B2 * | 9/2015 | Kumar | H04N 19/61 |
| 9,232,233 B2 * | 1/2016 | Zhou | H04N 19/197 |
| 9,313,501 B2 * | 4/2016 | Lin | H04N 19/172 |
| 9,319,448 B2 * | 4/2016 | Chen | H04L 65/607 |
| 9,363,524 B2 * | 6/2016 | Thodiyil | H04N 19/433 |
| 9,866,871 B2 * | 1/2018 | Lin | H04N 19/172 |
| 10,341,688 B2 * | 7/2019 | Lin | H04N 19/172 |
| 2007/0130493 A1 | 6/2007 | Barkley et al. | |
| 2007/0237231 A1 | 11/2007 | Sriram | |
| 2009/0219446 A1 | 9/2009 | Beric et al. | |
| 2012/0233405 A1 * | 9/2012 | Budagavi | G06F 12/0844 711/118 |
| 2013/0003845 A1 * | 1/2013 | Zhou | H04N 19/197 375/240.16 |
| 2013/0315306 A1 * | 11/2013 | Narasimhan | H04N 21/23439 375/240.12 |
| 2014/0036999 A1 * | 2/2014 | Ryu | H04N 19/50 375/240.12 |
| 2014/0092996 A1 * | 4/2014 | Wang | H04N 19/70 375/240.26 |
| 2014/0140398 A1 * | 5/2014 | Deshpande | H04N 19/46 375/240.12 |
| 2014/0168362 A1 * | 6/2014 | Hannuksela | H04N 13/161 348/43 |
| 2014/0188470 A1 | 7/2014 | Chang et al. | |
| 2015/0030073 A1 * | 1/2015 | Chen | H04N 19/597 375/240.16 |

(Continued)

OTHER PUBLICATIONS

Ibrahim et al, Implementation of error resilience technique for multiview video coding, 2014.*

(Continued)

*Primary Examiner* — Shan E Elahi
(74) *Attorney, Agent, or Firm* — Green, Howard & Mughal LLP.

(57) ABSTRACT

Techniques related to reference frame caching for video coding are described herein.

25 Claims, 13 Drawing Sheets

(56) References Cited

U.S. PATENT DOCUMENTS

| | | | |
|---|---|---|---|
| 2015/0055707 A1* | 2/2015 | Thodiyil | H04N 19/433 375/240.16 |
| 2015/0229934 A1* | 8/2015 | Li | H04N 19/29 375/240.16 |
| 2015/0304679 A1 | 10/2015 | Pasupuleti et al. | |
| 2015/0319457 A1 | 11/2015 | Samuelsson et al. | |
| 2015/0373357 A1* | 12/2015 | Pang | H04N 19/174 375/240.12 |

OTHER PUBLICATIONS

Alcocer et al, Evaluation of an HEVC hardware IME module using a SoC platform, 2016.*

International Search Report and Written Opinion for International Patent Application No. PCT/US2016/050622 dated Dec. 19, 2016.

Tsai, M.K., "Overview of H.264/AVC", Electrical Engineering National Central University, 2003, 100 pages.

Rafique et al.., "DMA-based Prefetching for I/O Intensive Workloads on the Cell Architecture", CF'08, May 5-7, 2008, Ischia, Italy, 10 pages.

Paul, et al., "A Long Term Reference Frame for Hierarchical BPicture based Video Coding", IEEE Transactions on Circuits and Systems for Video Technology, Oct. 2014, 15 pages.

* cited by examiner

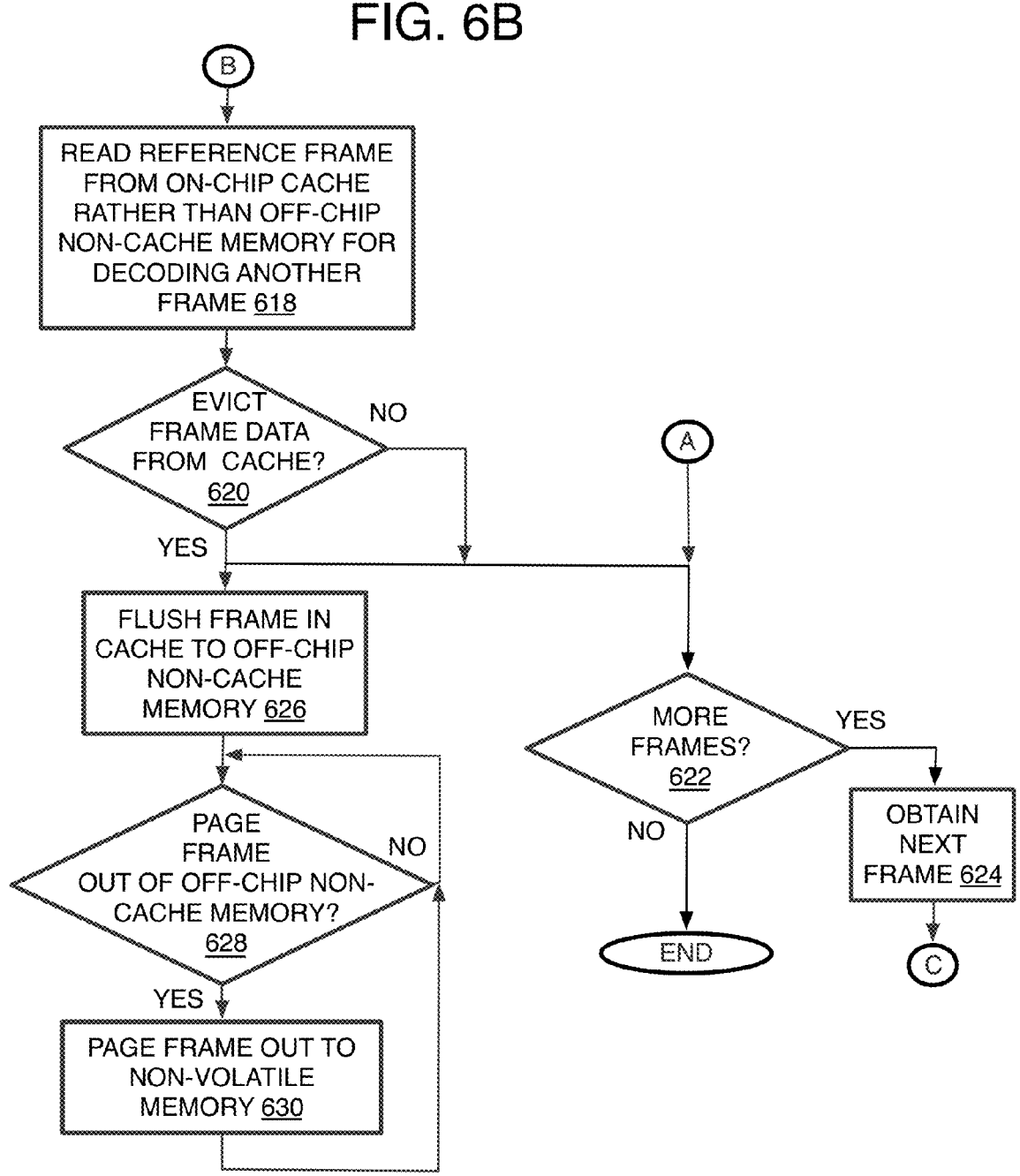

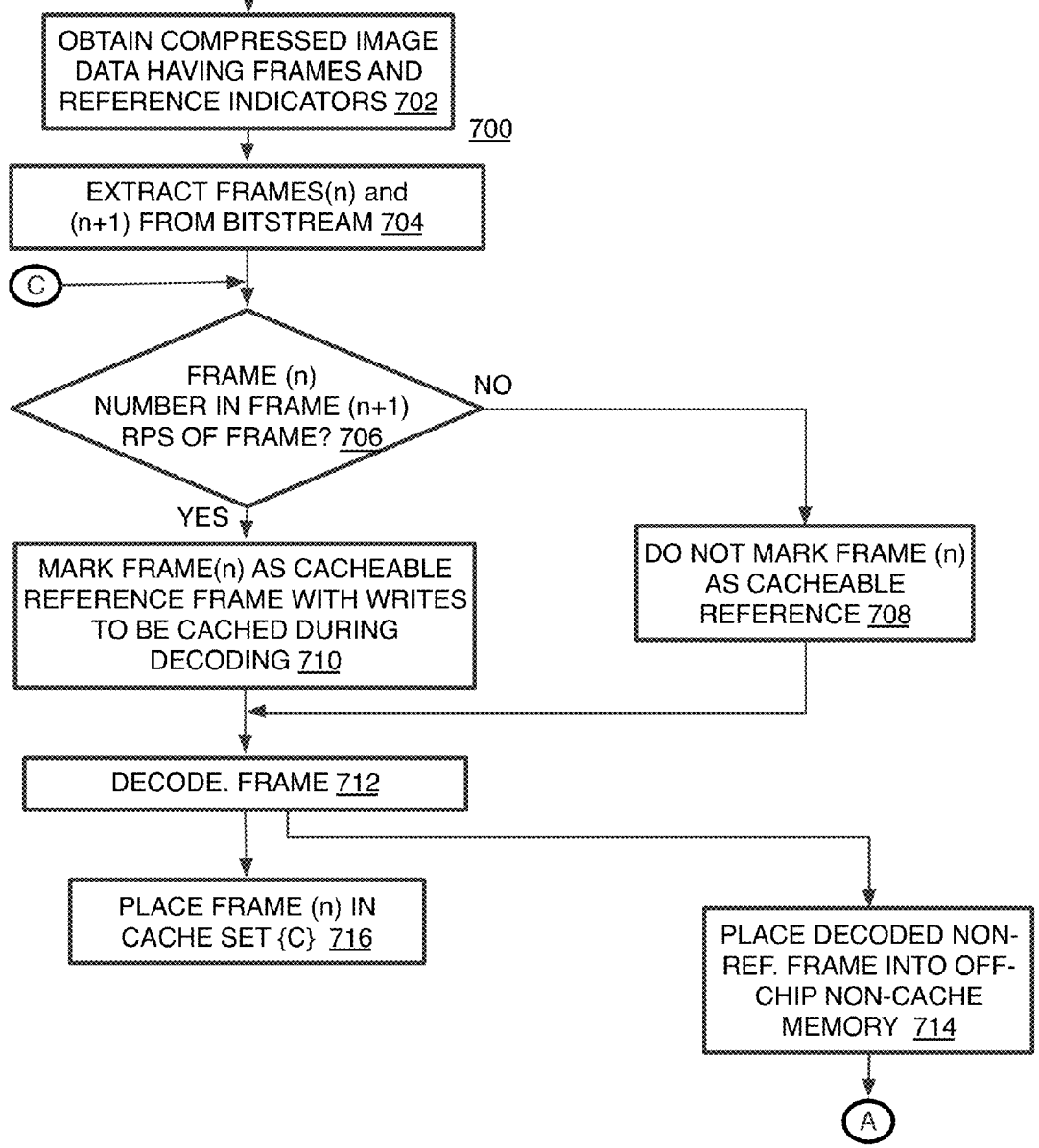

METHOD AND SYSTEM OF REFERENCE FRAME CACHING FOR VIDEO CODING

BACKGROUND

Due to ever increasing video resolutions, and rising expectations for high quality video images, a high demand exists for efficient image data compression of video while performance is limited for coding with existing video coding standards such as H.264/AVC (advanced video coding), H.265/HEVC (High Efficiency Video Coding) standards, and so forth. The aforementioned standards use expanded forms of traditional approaches to address the insufficient compression/quality problem, but the results are still insufficient.

Each of these typical video coding systems uses an encoder that generates data regarding video frames that can be efficiently transmitted in a bitstream to a decoder and then used to reconstruct the video frames. This data may include the image luminance and color pixel values as well as intra and inter-prediction data, filtering data, residuals, and so forth that provide lossy compression so that the luminance and color data of each and every pixel in all of the frames need not be placed in the bitstream. Once all of these lossy compression values are established by an encoder, one or more entropy coding methods, which is lossless compression, then may be applied. The decoder that receives the bitstream then reverses the process to reconstruct the frames of a video sequence.

Relevant here, the inter-prediction data may include data to reconstruct reference frames by using motion vectors that indicate the movement of image content between a reference frame and another frame being reconstructed (or decoded), and from the same sequence of frames. Conventionally, all decoded frames including reference frames are placed in temporary memory, such as RAM, while the reference frames may be fetched by a decoder to use the reference frames to decode other frames. This often requires a large memory transaction bandwidth that may result in delays to fetch the frames from such an external (or off-board) memory as well as require RAM with a large capacity to hold a buffer for decoded reference frames. Also, this is especially troublesome when the reference frames are provided in a higher image fidelity (high resolution system formats) such as HDR or others as mentioned herein where the amount of sampling and bit-depth is greater. These higher resolution reference frames are extremely large such that the capacity needed to store the reference frames in non-cache memory so that a decoder can fetch and use the reference frames to decode other frames may be the system limiter for providing high quality video experiences with these playback configurations. In one solution, reference frames may be placed in cache during decoding in order to reduce the DRAM or main memory bandwidth, reduce power, and improve latency tolerance. These techniques have been found to be inadequate due to inefficient techniques to determine whether a frame in a video sequence is actually going to be used as a reference frame, and in turn, whether and how long to keep the reference frame in the cache, resulting in relatively low cache hit rates.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIGS. 6A-6B is a detailed flow chart of an example method of reference frame caching for video coding;

FIGS. 7A-7B is another detailed flow chart of an example method of reference frame caching for video coding;

DETAILED DESCRIPTION

Figure 1:
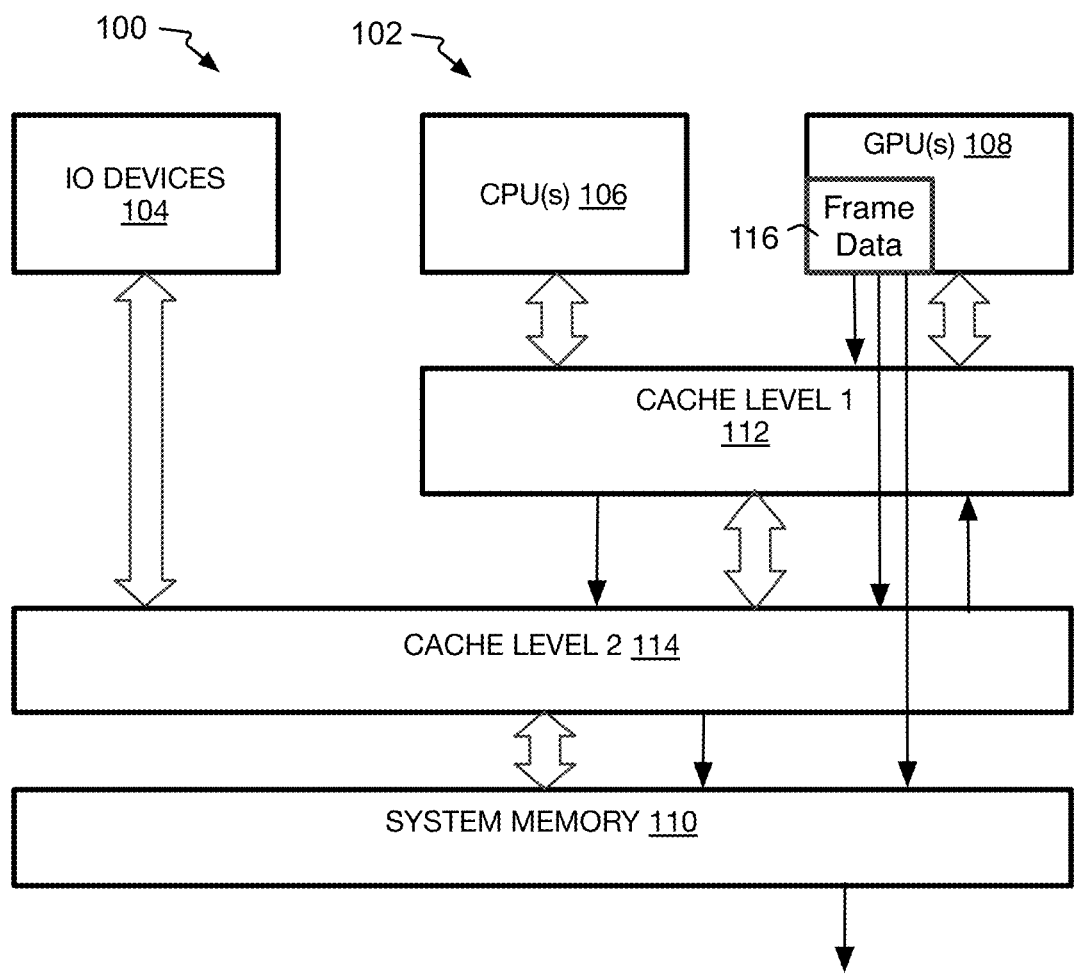
FIG. 1 is a schematic diagram of a memory hierarchy of a video coding device to provide the implementations described herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes as long as certain minimum components are provided such as an on-chip (or internal) or other local cache memory and an off-chip or external memory relative to a processor chip and as described herein. For instance, various architectures employing, for example, multiple integrated circuit (IC) chips and/or packages, and/or various computing devices and/or consumer electronic (CE) devices such as set top boxes, televisions, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM) including dynamic RAM (DRAM) and double data rate (DDR) DRAM; magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as DRAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to effect such feature, structure, or characteristic in connection with other implementations whether or not explicitly described herein.

Systems, articles, and methods are described below related to reference frame caching for video coding.

Video playback is a highly visible, widely used feature and very important to devices ranging from the internet of things (IoT) to servers. Media content is quickly transitioning from HD 1920×1080 8 bit 4:2:0 chroma sampling to higher resolutions with higher resolution chroma sampling and greater bit depths to provide a better user visual experience. For example, 4K UltraHD content from BluRay discs and streaming from known online video provider websites are now available, and 8K content will be available in the future. This content will be coded with High Dynamic Range (HDR) image standard that provides higher resolution video and requires content to be encoded with 10, 12 or more bits per chroma or luma component. In addition, 4:2:2 and 4:4:4 chroma sampling is in demand for server and wireless display scenarios, respectively, for better color fidelity. These devices consume a very large amount of memory bandwidth.

Video encoding and decoding can utilize multiple reference frames for prediction, dictated by codec level support. As mentioned above, during inter-prediction, previously decoded frames in a video sequence of frames may be used as reference frames to reconstruct another frame in the video sequence. When the reference frames are provided in high resolution system formats, such as HDR or others as mentioned above, the reference frames are still stored in their uncompressed sizes in a decoded picture buffer (DPB) to hold the reference frames so that a decoder can fetch and use the reference frames to decode other frames. In many cases, this may be the system limiter for providing high quality video experiences with these playback configurations since the reference frame bit sizes may be extremely large.

One way to alleviate memory pressure is by adding local (or internal) or on-chip cache to the system and placing the DPB or reference buffer in the cache. Cache is typically located on-board the processor (or has a more direct connection) than other remote memory such as off-chip or external memory, such as external DRAM, so that any hits in the data stored in cache avoids the more costly power and time consuming memory fetch to external RAM and may reduce the capacity requirements for the external RAM or increase efficiency by permitting the external RAM to store other data. For video coding systems using standard definition (SD) or high-definition (HD) resolutions on current hardware systems that have relatively large cache compared to the frame size (such a maximum of 3 MB), selective caching is not a large issue since many frames of a single video data stream can fit into the cache (e.g. 128 MB cache). In this case, this arrangement is still very beneficial since it is possible to hold a relatively large reference frame buffer that has the capacity for many frames in the local cache to catch almost all of the reference frames in the cache before any are removed (or evicted) from the cache while decoding the video sequence.

However, conventional coders that use higher resolutions, greater bitdepths, and in turn, larger uncompressed frames, can only place a very small number of frames into the cache. Such high resolution systems, such as HEVC (H.265), may use frames that range in size from 63 MB to 253 MB each, and depending on the resolution as shown on Table 1 below. The number of frames that can be stored on a 512 MB L2 cache to form a DPB buffer on the cache and depending on the resolution also is listed below on Table 1 below.

TABLE 1

Cache Capacity for High Resolution Reference Frames

| Resolution | Bit Depth/Sampling | Size (MB) | Number of Frames that Fit in 512 MB Cache DPB |
| --- | --- | --- | --- |
| 7680 × 4320 | 12b/4:4:4 | 253 | 2 |
| 7680 × 4320 | 10b/4:2:2 | 127 | 4 |
| 7680 × 4320 | 12b/4:2:0 | 95 | 5 |
| 3840 × 2160 | 12b/4:4:4 | 63 | 8 |

A system streaming data coded in HEVC (H.265) format can require a maximum decoded picture buffer (DPB) size of six frames for 8K or 16 frames for 4K. The video players and codecs may allocate the reference frames as well as extra frames to be placed in cache, such as up to seven more frames, in some cases, for rendering and display synchronization. Typically, however, only 3-4 reference frames are active at any one time. In operation, such a system may place the most recent one to n consecutive frames in cache depending on the capacity of the buffer on the cache and in a first-in first-out basis assuming that one or more of the frames will be used as reference frames for a later frame yet to be decoded. Once a new frame is written to a buffer on cache, another frame needs to be removed from cache in a least recently used (LRU) or other manner such as first-in, first-out (FIFO). Since the frame size for these resolutions is about 63 MB to 253 MB as shown on Table 1 for example, no way exists for the system to place all of the desired reference frames into the 512 MB cache when the system needs those reference frames, especially considering cache that may need to be shared with other traffic from the central processing unit (CPU) or input/output (TO) devices on a computer. Thus, such a system that places all of the frames in the cache results in many cache hit misses, and the system then must inefficiently fetch a relatively large number of the reference frames from non-cache memory (such as RAM) anyway.

To resolve these issues, the present method and system disclosed herein intelligently establishes decoded reference frame buffers on the local or on-chip L2 cache by using coded stream information such as non-video coding layer (VCL) data or data in slice headers to determine which frames are needed as reference frames to decode the next frames. Then, those frames pre-determined to be used as reference frames in the near future will be placed in the cache, while those frames that are not to be used as reference frames are placed directly in external non-cache memory (such as external RAM or other memory) rather than cache. This will result in maintaining more of the needed reference frames in cache, rather than pre-maturely removing them from the cache, and in turn, may result in an increase in cache hits as well as a decrease in the overall required non-cache off-chip or external memory (external RAM or other memory) bandwidth, reduction in memory read bandwidth, and time consumption due to memory transactions with the non-cache memory.

Some of the industry standards and widely adopted codecs currently used for video compression are H.264/AVC and HEVC. Herein, the present method and system for reference frame caching are described with implementations for AVC and HEVC. For AVC, the network abstraction layer (NAL) unit designations at the slice header, and particularly the nal_ref_idc syntax element found in the slice headers, can be used to determine whether a frame is to be stored in cache as a reference frame to be used to decode other frames. Likewise in HEVC, the reference picture set (RPS) of a frame (or slice) may be used to determine which frames are to be used as reference frames for placement into cache. The RPS reference frame indicators obtained from a compressed bitstream of video data also may be used to determine when to remove a reference frame from cache, increasing the efficiency even further. The details are provided below.

Referring to FIG. 1, an example simplified memory hierarchy 102 used to explain memory access to implement the present reference caching methods may be shown on a computer or other video coding device 100 (such as a laptop, smartphone, wearable, server, and so forth) and that has input/output (IO) devices 104 (touch screen, keyboard, and so forth described in greater detail below (FIGS. 12-14), one or more central processing units (CPU(s)) 106 to perform general processing, and one or more graphics processing units (GPU(s)) 108, either of which may include an image signal processor (ISP) for performing the video coding operations, and either of which may perform the reference frame caching.

To hold data that is being used for current or near future operations by the processors, the device 100 may have a main temporary or volatile memory 110, which may be a main system double data rate (DDR) dynamic random access memory (DRAM) with a size of 4 GB and processing speed of 150 GB/sec as one possible example (many other examples exist). A level 1 (L1) cache may hold 4 MB of data at a processing speed of 150 GB/sec by one example, but is mainly used for small amounts of data and the most immediately needed data. Thus, many systems add a second level 2 of cache (L2 cache) here with a 512 MB capacity at a speed of 100 GB/sec as one possible example. The L2 cache is provided to hold a larger amount of data and, in some cases, data that is not quite as immediately needed as that in L1 cache. The L1 cache is the fastest and closest cache to the processors, and is often the most expensive, and therefore relatively smaller compared to higher levels of cache, such as L2, with slower, farther, and cheaper cache. Some systems have more levels than just two.

In operation, frame data 116 received in a bitstream for example may be decoded by the GPU 108. The decoded (or uncompressed) frames then may be written to L1 cache 112, L2 cache 114, or system memory 110 in cacheline form. Reference frames are cached in L2 cache 114 rather than L1 or system memory 110 as described below. Most of the reference frames will be held in L2 cache before a processor reads the L2 cache to fetch reference frames, or portions of frames such as slices, to decode other frames. Once the reference frames are no longer used, they may be evicted from the cache 114 to temporary or system memory 110 to be held with the other decoded frames of the video sequence. Thereafter, under memory pressure (over-allocation of the memory), or as the frames are needed for playback by a display device or otherwise downloading for storage, frame data may be paged out (removed) from system memory 110 to non-volatile or permanent memory.

The cache is referred to as being the faster and closer memory levels as the cache is typically formed by hardware on-board with the processor(s) where a bus or other data communication line connects the processor(s) chip or processor board to separate volatile memory chips on the same mother board as the processor board is mounted for example or on other separate boards holding the volatile memory. A number of alternatives are provided with systems 1200, 1300, and/or 1400 described below. It will be appreciated that a main non-volatile or permanent memory is not shown even though in certain cases it also could be used as temporary memory for storing decoded frames during playback of videos but is often much slower than temporary memory used for current processor operations.

Figure 2:
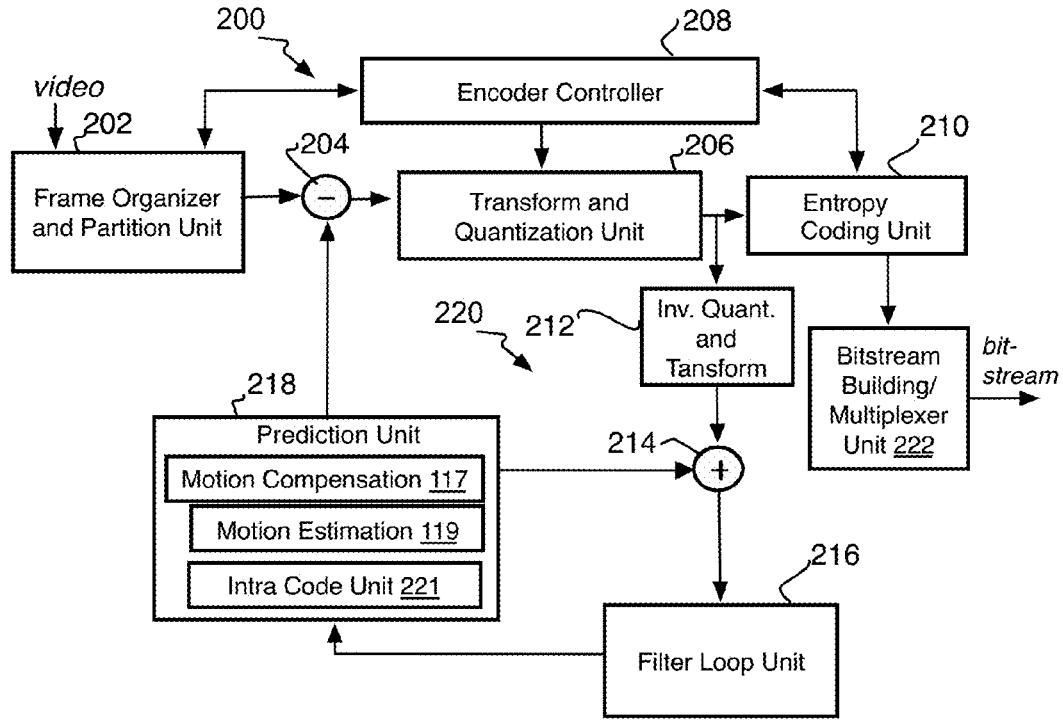
FIG. 2 is an illustrative diagram of an example encoder for a video coding system.
Figure 3:
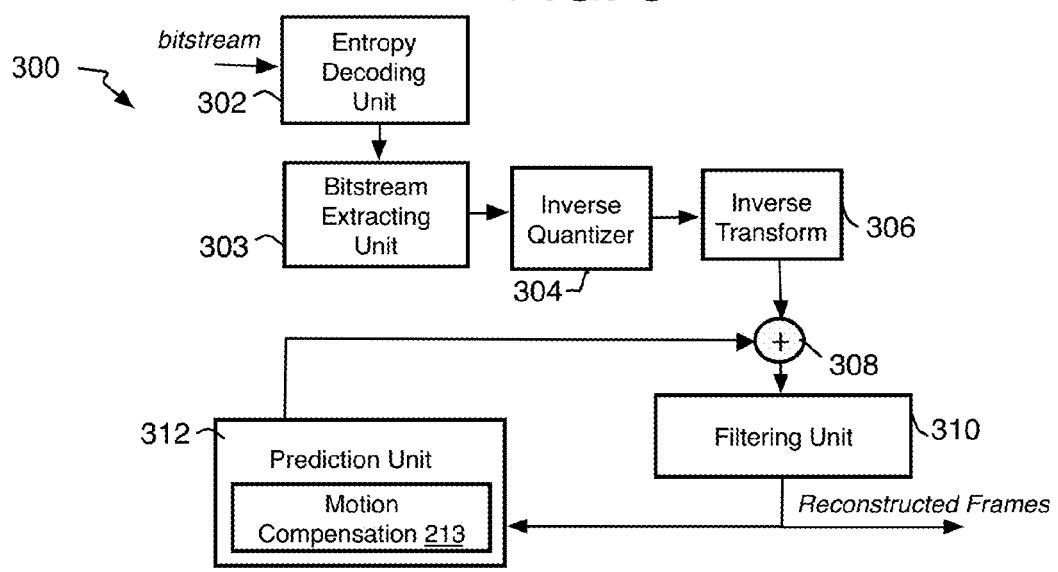
FIG. 3 is an illustrative diagram of an example decoder for a video coding system.

Referring to FIGS. 2-3, to place the method and system of reference frame caching herein in context, an example, simplified video coding system 200 is arranged with at least some implementations of the present disclosure and that performs inter-prediction using reference frames that may be stored in cache. In various implementations, video coding system 200 may be configured to undertake video coding and/or implement video codecs according to one or more standards. Further, in various forms, video coding system 200 may be implemented as part of an image processor, video processor, and/or media processor and undertakes inter-prediction, intra-prediction, predictive coding, and residual prediction. In various implementations, system 200 may undertake video compression and decompression and/or implement video codecs according to one or more standards or specifications, such as, for example, H.264 (MPEG-4)/AVC and H.265 (High Efficiency Video Coding or HEVC), but could also be applied to VP9 or other VP#-based standards or other known standards. Although system 200 and/or other systems, schemes, or processes may be described herein, the features of the present disclosure are not necessarily all always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder.

In some examples, video coding system 200 may include additional items that have not been shown in FIG. 2 for the sake of clarity. For example, video coding system 200 may include a processor, a radio frequency-type (RF) transceiver, splitter and/or multiplexor, a display, and/or an antenna. Further, video coding system 200 may include additional items such as a speaker, a microphone, an accelerometer, memory, a router, network interface logic, and so forth.

For the example video coding system 200, the system may be an encoder where current video information in the form of data related to a sequence of video frames may be received for compression. The system 200 may partition each frame into smaller more manageable units such as slices and then the slices into blocks for example, and then compare the frames to compute a prediction. If a difference or residual is determined between an original block and prediction, that resulting residual is transformed and quantized, and then entropy encoded and transmitted in a bitstream out to decoders or storage. To perform these operations, the system 200 may include a frame organizer and partition unit 202, a subtraction unit 204, a transform and quantization unit 206, and an entropy coding unit 210 for entropy coding of the video coding layer (VCL) which may include the chroma, luminance and other pixel data. System 200 also may have a bitstream building and multiplexing unit 222 that forms the non-VCL layer and may include entropy encoding the non-VCL layer. The unit 222 may place both the VCL and non-VCL data into the bitstream, and an encoder controller 208 communicating with and/or managing the different units. The controller 208 manages many aspects of encoding including rate distortion, selection or coding of partition sizes, prediction reference types, selection of prediction and other modes, and managing overall bitrate, as well as others.

The output of the transform and quantization unit 206 also may be provided to a decoding loop 220 provided at the encoder to generate the same reference or reconstructed blocks, frames, or other frame partitions as would be generated at the decoder. Thus, the decoding loop 220 uses inverse quantization and transform unit 212 to reconstruct the frames, and adder 214 along with other assembler units not shown to reconstruct the blocks within each frame. The decoding loop 220 then provides a filter loop unit 216 to increase the quality of the reconstructed images to better match the corresponding original frame. This may include a deblocking filter, a sample adaptive offset (SAO) filter, and a quality restoration (QR) filter. The decoding loop 220 also may have a prediction unit 218 with a decoded picture buffer to hold reference frame(s), and a motion estimation unit 219 and motion compensation unit 217 that uses motion vectors for inter-prediction, and intra-frame prediction module 221. Intra-prediction or spatial prediction is performed on a single I-frame without reference to other frames. The result is the motion vectors and predicted blocks (or coefficients).

In more detail, and relevant here, the motion estimation unit 219 uses pixel data matching algorithms to generate motion vectors that indicate the motion of image content between one or more reference frames and the current frame being reconstructed. The motion vectors are then applied by the motion compensation unit 217 to reconstruct the new frame. For an AVC system, the identity of the reference frames or slices of a frame may be provided to the bitstream builder unit 222 that constructs the frame or slice headers including the NAL for the bitstream and populates the NAL unit header reference indicator value for individual frames or slices in a frame with the appropriate values. As discussed in detail below, and relevant here, the reference indictor (or syntax) nal_ref_idc (which stands for NAL reference identification code) in the slice headers may be set to 1 to indicate the frame is to be saved as a reference frame. For an HEVC system, a list is formed for each frame that shows which frames are to be used as reference frames by the motion compensation unit for that frame. This list or reference picture set (RPS) is then placed in each slice header of individual or every slice of the frame. The RPS information can also be signaled in the SPS (sequence parameter set) that provides information for a sequence of frames and then referenced by the slice headers. The slice headers are then placed in the bitstream with the VCL data by the bitstream builder 222. These values are then placed into the bitstream.

In operation, the video data in the form of frames of pixel data may be provided to the frame organizer and partition unit 202. This unit holds frames in an input video sequence order (picture order count (POC) order), and the frames may be retrieved in the order in which they need to be coded (by decoding order number (DON) for example). For example, backward reference frames are coded before the frame for which they are a reference but are displayed after it. The input picture buffer may also assign frames a classification such as I-frame (intra-coded), P-frame (inter-coded, predicted from a previous reference frame), and B-frame (inter-coded frame which can be bidirectionally predicted from previous frames, subsequent frames, or both). In each case, an entire frame may be classified the same or may have slices classified differently (thus, an I-frame may include only I slices, P-frame can include I and P slices, and so forth. In I slices, spatial prediction is used, and in one form, only from data in the frame itself. In P slices, temporal (rather than spatial) prediction may be undertaken by estimating motion between frames. In B slices, and for HEVC, two motion vectors, representing two motion estimates per partition unit (PU) (explained below) may be used for temporal prediction or motion estimation. In other words, for example, a B slice may be predicted from slices on frames from either the past, the future, or both relative to the B slice. In addition, motion may be estimated from multiple pictures occurring either in the past or in the future with regard to display order. In various implementations, motion may be estimated at the various coding unit (CU) or PU levels corresponding to the sizes mentioned below. For older standards, such as AVC, macroblocks or other block basis may be the partitioning unit that is used.

Specifically, when an HEVC standard is being used, the prediction partitioner unit 204 may divide the frames into prediction units. This may include using coding units (CU) or large coding units (LCU). For this standard, a current frame may be partitioned for compression by a coding partitioner by division into one or more slices of coding tree blocks (e.g., 64×64 luma samples with corresponding chroma samples). Each coding tree block may also be divided into coding units (CU) in quad-tree split scheme. Further, each leaf CU on the quad-tree may either be split again to 4 CU or divided into partition units (PU) for motion-compensated prediction. In various implementations in accordance with the present disclosure, CUs may have various sizes including, but not limited to 64×64, 32×32, 16×16, and 8×8, while for a 2N×2N CU, the corresponding PUs may also have various sizes including, but not limited to, 2N×2N, 2N×N, N×2N, N×N, 2N×0.5N, 2N×1.5N, 0.5N×

2N, and 1.5N×2N. It should be noted, however, that the foregoing are only example CU partition and PU partition shapes and sizes, the present disclosure not being limited to any particular CU partition and PU partition shapes and/or sizes.

As used herein, the term "block" may refer to a CU, or to a PU of video data for HEVC and the like, or otherwise a 4×4 or 8×8 or other rectangular shaped block. By some alternatives, this may include considering the block as a division of a macroblock of video or pixel data for H.264/AVC and the like, unless defined otherwise. One or more of the blocks may form a slice or frame portion that is compressed and uncompressed together. A slice may be formed of at least more than one block or many blocks where there are just a few slices per frame, or there may be many slices on a frame.

The current blocks may be subtracted from predicted blocks from the prediction unit 218, and the resulting difference or residual is partitioned as stated above and provided to a transform and quantization unit 206. The relevant block or unit is transformed into coefficients using discrete cosine transform (DCT) and/or discrete sine transform (DST) to name a few examples. The quantization then uses lossy resampling or quantization on the coefficients. The generated set of quantized transform coefficients may be reordered and then are ready for entropy coding. The coefficients, along with motion vectors and any other header data, are entropy encoded by unit 210 and placed into a bitstream as VCL, and along with the NAL or non-VCL data by the bitstream builder unit 222 for transmission to a decoder.

Referring to FIG. 3, an example, simplified system 300 may have, or may be, a decoder, and may receive coded video data in the form of a bitstream. The system 300 may process the bitstream with an entropy decoding unit 302 to decode the pixel data along with the quantized residual coefficients as well as the motion vectors, prediction modes, partitions, quantization parameters, filter information, and so forth as well as the NAL or non-VCL data header information.

A bitstream extraction unit 303 separates the VCL data from the NAL unit or non-VCL data at the slice headers for example so that the NAL unit data can be used to control the decoding of the VCL data, and relevant here, the reference indicators at nal_ref_idc (for AVC) or the RPS (for HEVC) may be parsed from the bitstream and from at least one slice of individual or each frame. The reference indicators then can be used to determine whether a frame will be used a reference frame and should be placed into cache while it is being decoded and used as a reference to decode other frames. After the frame has been used as a reference and is no longer needed, the reference indicators can also be used to determine when to remove (evict) the reference frame from cache.

The system 300 then may use an inverse quantization module 304 and inverse transform module 306 to reconstruct the residual pixel data. Thereafter, the system 300 may use an adder 308 to add assembled residuals to predicted blocks to permit rebuilding of prediction blocks. These blocks may be passed to the prediction unit 312 for intra-prediction, or first may be passed to a filtering unit 310 to increase the quality of the blocks and in turn the frames, before the blocks are passed to the prediction unit 312 as part of reference frames or slices for inter-prediction. For this purpose, the prediction unit 312 may include a motion compensation unit 313 to apply the motion vectors. The motion compensation unit may use motion vectors received in the bitstream to determine whether a frame is to be used as a reference. This operation may be separate from the operation that determines whether a frame is a reference frame for determining whether to place the frame in cache or system memory. Otherwise, the motion compensation unit 313 uses the motion vectors to identify which frames are the reference frames, and then applies the motion vectors to reconstruct a frame. The motion compensation unit 313 may use at least one L1 cache to store single frame portions and/or perform compensation algorithms with the motion vectors, and use at least one L2 cache to store the most frequently used reference frames also as described in detail below. The prediction unit 312 may set the correct mode for each block or frame before the blocks or frames are provided to the adder 308. Otherwise, the functionality of the units described herein for systems 200 and 300 are well recognized in the art and will not be described in any greater detail herein.

Figure 4:
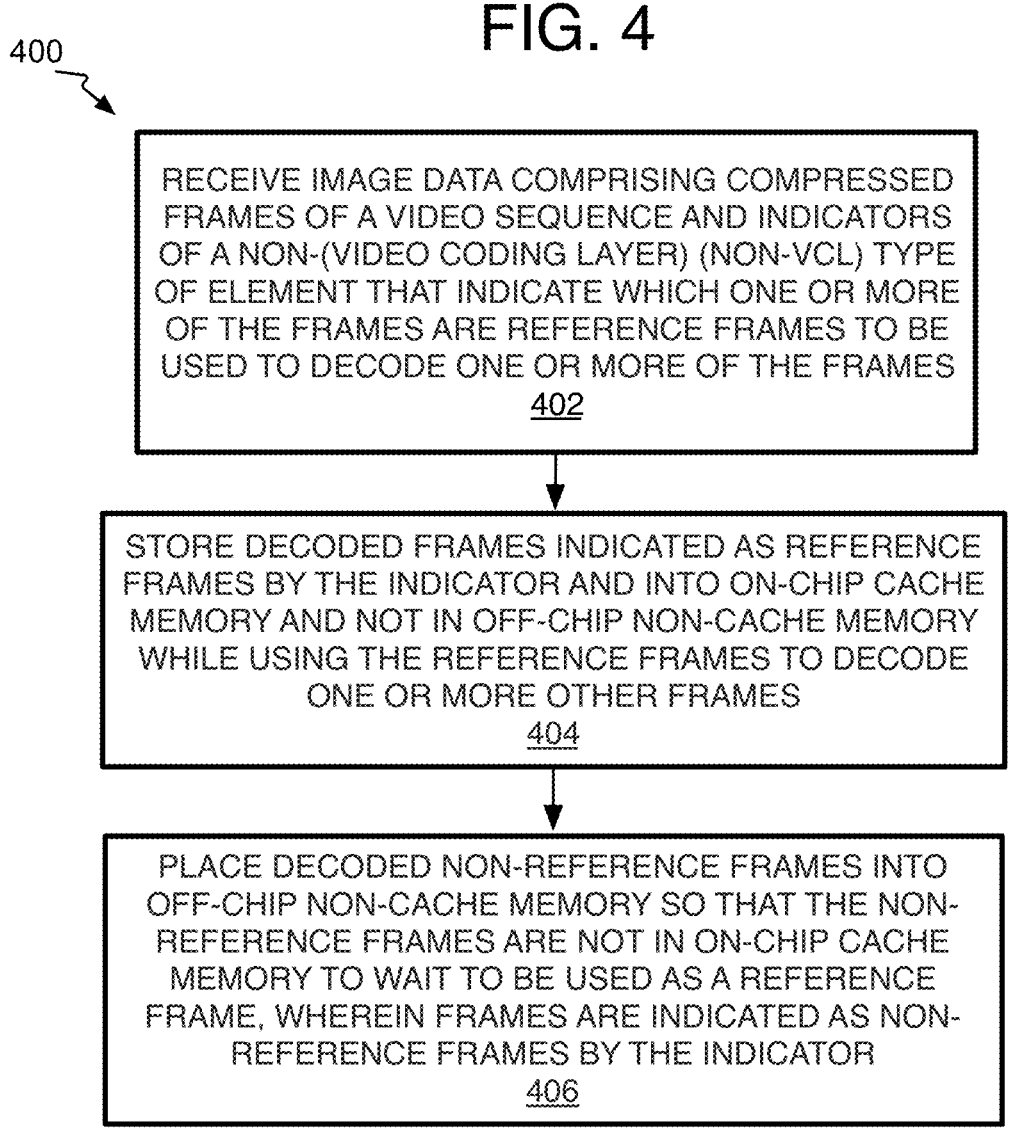
FIG. 4 is a flow chart of an example method of reference frame caching for video coding.

Referring now to FIG. 4, a process 400 arranged in accordance with at least some implementations of the present disclosure may provide a computer-implemented method of reference frame caching for video coding. In the illustrated implementation, process 400 may include one or more operations, functions or actions as illustrated by one or more of operations 402 to 406 numbered evenly. By way of non-limiting example, process 400 may be described herein with reference to operations discussed with respect to FIGS. 1-3, 5, and 12-14 with regard to example systems 100-300, 500, and 1200-1400 discussed herein.

The process 400 may comprise "receive image data comprising compressed frames of a video sequence and indicators of a non-(video coding layer) (non-VCL) type of element that indicate which one or more of the frames are reference frames to be used to decode one or more of the frames" 402, and as understood, the image data may be whatever data may be needed to reconstruct video frames using at least inter-prediction for video coding and at least including data of frames to be used as reference frames. As used herein, VCL data refers to the pixel-by-pixel data that may be provided such as chroma and luminance values, coefficients, residuals, and motion vectors (often placed at the macroblock level of the VCL data), and so forth. The non-VCL data or non-VCL type elements refers to data used to control the decoding of the VCL data and that is usually placed in the headers of the frame, sequence, slices, or other partition header for the coding, and therefore, may include syntax such as NAL unit headers of sequence or picture parameter sets. Such sets may provide the reference frame indicators as described in detail below. It should be noted that non-VCL type elements are in contrast to the type of data in the VCL, and is not necessarily limited to a specific format or standard such as HEVC and AVC. By a couple of possible examples used herein, the indicators are of non-video coding layer (non-VCL) type data such as the NRI (nal_ref_idc) value for MPEG formats such as AVC, or the reference picture set (RPS) of HEVC formats as described in detail below.

At a decoder, the bitstream, which may be formed of packets of image data, first may be entropy decoded before the reference indicators are extracted from the bitstream. The reference indicator may indicate whether the frame to which the indicator is associated is a reference frame to one or more other frames, or alternatively identifies other frames as reference frames for the frame in which the reference indicator is associated. Thus, for AVC, this operation may include reading the NAL unit header nal_ref_idc code to determine whether a current frame about to be decoded is a reference frame for other frames, and for HEVC, this operation may include reading or peeking at at least one RPS in a slice header of a slice of another frame to determine which frames are reference frames to the current frame. The RPS may be read from the next frame to be decoded after the current frame but could be other frames. Use of the indicator to select which frames to place in cache substantially increases the cache hits for reference frames. The details of many of these features are explained elsewhere herein.

The process 400 also may include "store decoded frames indicated as reference frames by the indicator and into on-chip cache memory and not in off-chip non-cache memory while using the reference frames to decode the one or more other frames" 404. Thus, by one example, the decoded frames are directed to cache, such as on-board (or internal) on-chip L2 cache, instead of off-chip (or external) non-cache memory such as off-chip or external RAM. This may include writing portions or slices of a frame to the on-chip cache memory as the decoding of those portions or slices is complete rather than waiting for an entire frame to be decoded before writing the frame to cache. It will be appreciated that complete decoding refers to a point that a frame (or slice of a frame) is no longer considered compressed but still may need further post-processing before the frame is ready to be used for display. Placing the reference frames in on-chip cache, and in one form directly placing the reference frames in on-chip cache after decoding, rather than off-chip non-cache memory saves memory transaction bandwidth to/from the non-cache memory and reduces delay to fetch the frames from the non-cache memory. The details are explained below.

The process 400 also may include "place decoded non-reference frames into off-chip non-cache memory so that the non-reference frames are not stored in on-chip cache memory to wait to be used as a reference frame, wherein frames are indicated as non-reference frames by the indicator" 406. As described in detail below, this may include placing the decoded frame indicated as a non-reference frame in off-chip non-cache memory, and in one case directly into the off-chip non-cache memory, in order to provide more capacity at the on-chip cache memory for frames indicated to be reference frames by the indicators. It will be appreciated that this operation does not exclude the situation where the non-reference frame could be placed back into the cache for other reasons, such as post-processing, re-encoding of the frame, preparation for transmission, or preparation for the display of the frames, and so forth, as long as the non-reference frame is not being placed into the on-chip cache to wait to be used as a reference frame for decoding another frame or the video sequence in which it is a part.

Also, the reference indicators may be used to determine when to remove (or evict) the reference frames or slices from the on-chip cache as well thereby increasing the capacity of the on-chip cache for reference frames still being used, or are about to be used, and in turn, increasing the cache hit rate even further. Particularly, when an HEVC-type standard is being used, slice headers of a frame each have a copy of an RPS for that frame, a reference frame number is listed on the RPS as long as it is being used as a reference or will be used as a reference in the near future. Once it is dropped from the RPS, the reference fame will no longer be used as a reference and can be removed from the cache. Thus, since the present operations read the RPS of a next frame, one at a time, it will reveal exactly when a reference frame is no longer in use and can be removed from the on-chip cache upon decoding of a current frame. Again, the details are explained below.

Figure 5:
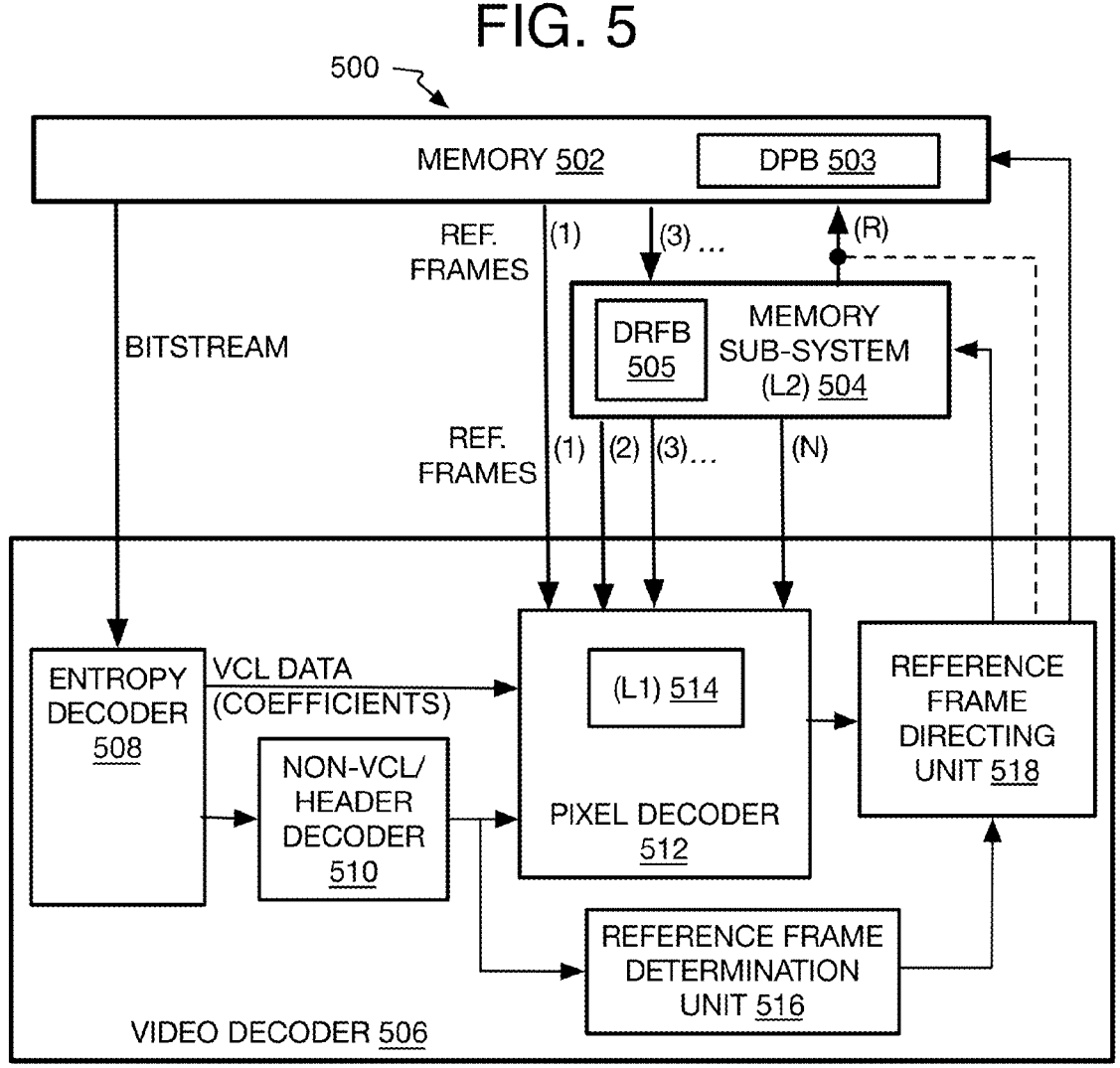
FIG. 5 is a schematic diagram of an example system for reference frame caching for video coding.

Referring to FIG. 5, an example video coding system 500 may be used to perform the implementations described herein. System 500 has one or more off-chip (or external) memories 502 (which may be a non-cache memory), such as RAM, DRAM, or DDR DRAM, or other temporary or permanent memory that may receive and store the entropy encoded and compressed image data as well as decoded frames on a decoded picture buffer (DPB) 503. The DPB 503 may hold all decoded (uncompressed) frames ready for post-processing or other operations. The system 500 also may have a memory sub-system 504 with on-board or on-chip (internal) L2 cache memory to form a decoded reference frame buffer (DRFB) 505 to hold reference frames to be used to decode other frames, and a decoder 506 with an entropy decoder 508, a non-VCL and header decoder 510, a pixel decoder (with a motion compensation unit for example) 512 that has a L1 cache 514, a reference frame determination unit 516, and a reference frame directing unit 518. The image data including payload data such as residual coefficients, pixel and luminance values as well as motion vectors, and so forth may be entropy decoded and placed in memory such as memory 502 or other memory (although this is not shown), and the non-VCL data is decoded by unit 510 where the non-VCL data may include the frame and/or slice headers that hold NAL unit syntax elements and RSP reference indicators depending on the codec format being used, and then may be placed in a memory (also not shown) such as memory 502, cache 504, or other memory as well.

As described in more detail below, when an AVC format is used, the reference determination unit 516 determines whether a current frame about to be decoded (or just after decoding) by the pixel decoder 512 is a reference frame for another frame by reading the nal_ref_idc value from the NAL unit header of at at least one slice header of the frame. When an HEVC format is used, the pixel decoding by the pixel decoder 512 is delayed for a current frame so that the reference frame determination unit 516 can read (or peek) at the RPS of at least one slice of a next frame to be decoded after the current frame to see if the current frame is listed as a reference of the next or other frame. The determination is then provided to the reference frame directing unit 518 to place the now pixel decoded current frame (and one slice at a time for a frame by example) in the L2 cache if the current frame is to be used as a reference, but otherwise into the memory 502 if the current frame is not to be used as a reference.

By one form, the pixel decoder 512 does not use these same reference indicators to determine which frames are to be used for motion compensation to reconstruct and decode other frames. Instead, the pixel decoder 512 uses the motion vectors to identify the reference frames and then fetch the reference frames from L2 cache or other memory as needed which were distributed to the cache and memory by the reference frame directing unit 518 in the first place. The motion vectors may include a source pixel, block, or other data area on a location on one frame and a distance and direction of displacement for placement of the data on another frame. The previously decoded frame or frames are then used as reference frames to determine the motion of the image data from the reference frames to the new frame being reconstructed as per the motion vectors. The fetching of the reference frames by the pixel decoder 512 is shown by reference frames (1) to (N) on FIG. 5 where reference frame (1) is obtained directly from memory 502 (possibly after searching for the frame at L2 cache 504 and resulting in a cache miss). This may occur when the on-chip cache does not have the capacity to store all reference frames needed to decode a current frame, such as when the L2 cache can store two reference frames but three or four reference frames are needed to decode a single frame. A reference frame (2) is found in L2 cache as placed there by the reference frame directing unit 518 from the determination by the reference frame determination unit 516. A reference frame (3) may be loaded into the on-chip L2 cache 504 after first being stored in the off-chip non-cache memory 502. This could occur due to capacity limits (and possibly while cache thrashing occurs) of the cache as with reference (1) except here, cache capacity became available to load the reference frame into on-chip cache memory 504 before it was needed for decoding.

As mentioned, ideally, the reference frame is obtained from L2 cache 504 by the pixel decoder 512. The pixel decoder 512 also may have at least one L1 cache 514 to store single reference frame portions to attempt to obtain a first cache hit on a reference frame, and/or use the L1 cache to perform compensation algorithms with the motion vectors for example or other computations. Once a frame is reconstructed, the frame is directed as just mentioned.

When an HEVC format is used and the determination unit 516 uses the RPS of the frames to determine whether a frame or slice is to be used as a reference, the determination unit 516 also learns when a reference frame will no longer be used as a reference. Thus, when the pixel decoder is through using a frame as a reference, that old or retired reference frame is then removed (evicted or flushed) from the L2 cache 504 and back into memory 502 for other processing as shown by arrow (R). Otherwise, the L2 cache may be emptied by typical protocols such as least recently used (LRU), FIFO, and other techniques, some of which are mentioned below.

For one example implementation, an efficient reference frame caching process is described as follows.

Figure 6A:
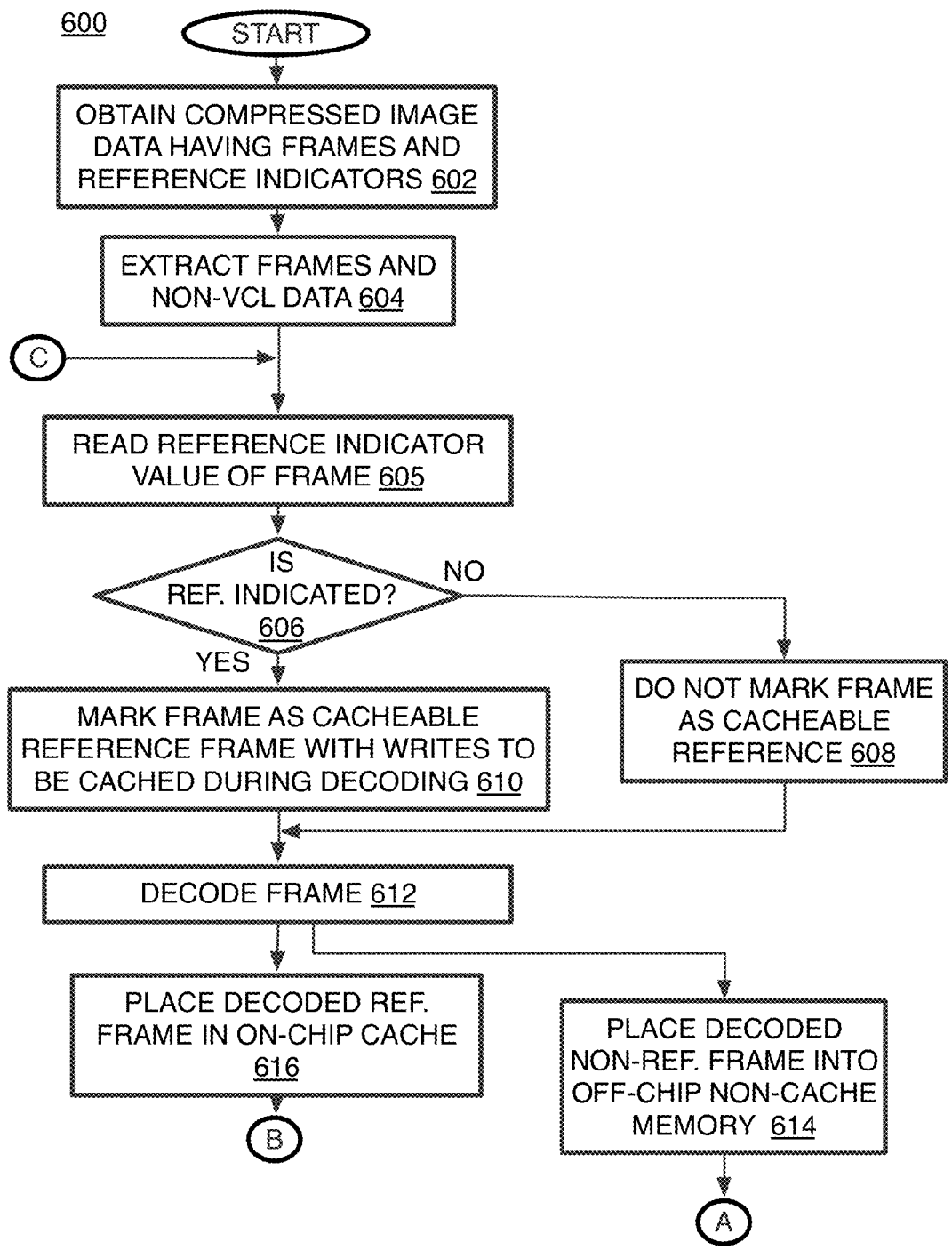

Referring now to FIGS. 6A-6B, an example reference frame caching process 600 is arranged in accordance with at least some implementations of the present disclosure. In this example, AVC is used as the codec format. In the illustrated implementation, process 600 may include one or more operations, functions or actions as illustrated by one or more of operations 602 to 630 numbered evenly. By way of non-limiting example, process 600 will be described herein with reference to operations discussed with respect to FIGS. 1-3, 5, 8-10, and 12-14, and may be discussed with reference to example systems 100, 200, 300, 500, 1200, 1300, and/or 1400 discussed herein.

Process 600 may include "obtain compressed image data having frames and reference indicators" 602, and particularly, and as explained above, this includes receiving a bitstream with VCL data including pixel data of frames in a video sequence that may be used as reference frames, and particularly the luminance and chroma data, as well as motion vectors and any other data used to reconstruct the frame. For an AVC format, the non-VCL data includes PPS (picture parameter set) data that holds the codes for single frames and provides individual slices with their own headers which includes a network abstraction layer (NAL) unit header with an NAL unit (nal_unit). The nal_ref_idc (NAL reference identification code or NRI) syntax element in the nal_unit may be used as an indicator and may be used to determine whether a frame will be used as reference or not, and in turn, whether the frame should be written to the cache or to system or other memory. One example NAL unit header is as follows:

TABLE 2

| NALU HEADER: | | |
|---|---|---|
| nal_unit( NumBytesInNALunit) { | C | Descriptor |
| forbidden_zero_bit | All | f(1) |
| nal_ref_idc | All | u(2) |
| nal_unit_type | All | u(5) | where the descriptor column indicates how many bits each code has, and the C column indicates the category the syntax element is applied to, in this case All. Forbidden_zero_bit value uses a single bit that indicates whether the NAL unit type octet and payload contain bit errors or other syntax violations. The value 0 indicates no error is in the payload, and 1 indicates the presence of an error.

The Nal_ref_idc (NRI) may use two bits and have a code of 0 (or binary 00 to fill two bits) to indicate that no slice on the frame is used as a reference, and the code is set to 1 (binary 01) or other non-zero number to indicate that at least one of the slices on the frame is used as a reference for one or more other frames. Thus, all of the slice headers on a frame have the same indicator set at the same value for nal_ref_idc. The indicator also may be placed in a frame or sequence header instead. The NRI value indicates the priority or importance of the data with highest value being 3 (e.g. sequence header), lowest value being 1 (e.g. Slice data of B frame) and 0 meaning no reference frame data as mentioned.

The Nal_unit_type (TYPE) specifies the NAL unit payload type with 5 bits, and here the value 5 (00101) indicates an intra decoded reference (IDR) picture which is an I-frame and which only holds I-slices or SI-slices. A 7 (00111) indicates a sequence parameter set, and an 8 (01000) indicates a picture parameter set for example.

Process 600 may include "extract frames and non-VCL data" 604. Particularly, the compressed frames and the non-VCL data, often in packet form, are extracted or parsed from the bitstreams, and this operation may include entropy decoding this data so that the frames are ready for pixel decoding and so that the non-VCL data including the reference frame indicators can be read. Thus, this operation also may include receiving the data for the slice (and frame or sequence) headers and placing that data in memory (such as off-chip temporary memory or RAM).

Process 600 may include "read reference indicator value of frame" 605, and specifically, reading an indicator value that may be found in a header of a slice (or frame or other area). For AVC format, the Nal_unit nal_ref_idc is read. Other formats may have a similar indicator, and as mentioned, indicates whether the current frame for which the indicator is associated is a reference frame because at least one of the slices of the frame is to be used as a reference. To state it another way, when the indicator is in the header of a frame or slice, the indicator may indicate whether that frame is a reference frame. Also, there may by one indicator stored in the header of each or individual slices of a single frame. In this case, as mentioned, multiple or each slice header may have a duplicate copy of the same indicator with the same indicator value, thereby indicating that the entire frame is to be placed in the on-chip cache memory so that any data on that frame may be used as a reference for inter-prediction. By alternative forms, the reference indicator may be placed in a single frame or picture header (or sequence header) that indicates whether the frame as a whole is a reference frame.

Since the indicator is duplicated to each slice, the process may read the indicator on a single slice header rather than reading the indicator on multiple slice headers. This may be a header of a certain slice, such as the first slice of a frame that will be decoded, or a slice that has a certain position on the frame, and so forth. Otherwise, multiple indicators at different slice headers of a frame may be checked to ensure one of the indicators is not providing an erroneous reading.

Process 600 may include a test "is reference indicated?" 606. Thus, the indicator is read, and as mentioned for AVC, the nal_ref_idc syntax element code is checked in at least one slice header (although more than one slice header could be checked) to determine whether it is set to 1 or other non-zero number which may indicate that the frame is a reference frame, or whether the indicator is set to 0 indicating that the frame is not to be used as a reference. Many variations are possible.

When the frame is not to be used as a reference, process 600 may include "do not mark frame as cacheable reference" 608. This is done by indicating to the hardware, and in some forms initiated by the reference directing software, not to cache this frame when the hardware is being programmed. This may be performed just as any other frame or other data is marked (or indicated) to be placed in cache or not. So marked as a non-reference frame, the writes for the non-reference frame, once it is decoded, is to off-chip system or other non-cache memory instead of to on-chip cache memory (such as L2 cache). By one form, the marking may take place before a frame is decoded and while the decoder is reading the non-VCL data for the frame anyway. By another form, the reading of the indicator could be performed just after the frame is decoded but before storing the frame in on-chip cache or off-chip non-cache memory.

On the other hand, once a frame is determined to be a reference frame, process 600 may include "mark frame as cacheable reference frame with writes to be cached during decoding" 610. As mentioned, this is performed by software programming hardware that indicates the caching preference of any frame or any data, and may be initiated by the reference directing unit. By one example, the marking may be performed by the reference frame determination unit 516. The marking is shown to occur before the decoding but may be performed just after the frame is decoded.

Whether or not the frame is marked as a reference, process 600 may include "decode frame" 612, and decode the frame to its non-compressed form before placing the frame into on-chip cache memory, such as L2 cache, if the frame is a reference, and into off-chip non-cache memory, such as RAM, if it is not a reference. The decoding may proceed slice-by-slice until the entire frame is complete, and the writes of the slices to memory also may occur slice by slice so that the decoding of the entire frame may not be finished when slices of the frame are already being saved. When the current frame (or slice) being decoded is a P-frame or B-frame for example, this operation may include obtaining other reference frames or slices from cache, and if a cache miss occurs, then obtaining the reference frame directly from the temporary off-chip non-cache memory, or by first placing the frame into the L2 cache from the off-chip non-cache memory when there is sufficient time to do so. These non-cache transmissions, however, are not the goal of the present methods. Instead, the present process is implemented to minimize the occurrence of these non-cache transmissions. Also, it will be understood that intra-coding, where a slice, block, or portion of a frame is used to decode another part of the same frame, is used for I-frames (or I-slices) but is otherwise not discussed herein.

In order to perform inter-prediction decoding, a pixel decoder may use motion vectors to construct reference lists for a frame, and in one case, does not use the reference indicator that is used to determine whether a frame or slice should be placed into on-chip cache memory for use as a reference. Instead, and as mentioned previously, the motion vectors may include a source frame that indicates the reference frame(s) to be fetched and used to decode the present frame. By other alternatives, an index of reference frames is built by reading the motion vectors and is used to fetch the reference frames. These processes, however, still do not use the non-VCL data syntax element nal_ref_idc (or similar) to determine where to save reference frames versus non-reference frames.

The pixel decoder may search for the reference frames in the L2 cache, but if the fetch in the L2 cache results in a miss, or when there are more reference frames for a current frame than reference frames in the L2 cache, the identified reference frames may be fetched from other memory(ies). Thus, then, the pixel decoder may attempt to fetch reference frames from the off-chip non-cache memory.

Once the non-reference frames are decoded, the process 600 may include "place decoded non-ref. frame into off-chip non-cache memory" 614, and particularly, into the off-chip memory. The non-reference frame may be written to the decoded picture buffer (DPB) in the off-chip non-cache memory rather than the DPB in L2 cache for reference frames. The DPB buffer in the non-cache memory may hold the frames ready for permanent storage, display, or transmission, or post-processing such as enhancements, refinement, image sharpness adjustments, or scaling of the image data of the frames to name a few examples. By one form, the non-reference frames are placed directly into off-chip non-cache memory so that the on-chip cache has more capacity to hold other frames indicated to be reference frames by the indicator. Also, the non-reference frames intentionally still may be placed in cache thereafter but for other reasons such as post-processing, preparation for display and transmission and so forth. While the frames will need to be displayed eventually and can benefit from being in the cache, typically decoders will decode so many frames ahead of time before the decoded frames are being post-processed or prepared for display, it is unlikely that the reference frames to be used as references will still be in the cache at the time of further processing and display of the frames in the off-chip DPB.

Once the non-reference frame is placed in the non-cache memory, process 600 may include a test "more frames" 622 to determine whether there are more frames in the video sequence. If so, process 600 may include "obtain next frame" 624. In this case, the process loops back to operation 605 to read the reference indicator of the next frame. If not, the reference caching process may end, and post-processing or other operations may be performed.

Returning to the case where a reference frame was decoded, process 600 then may include "place decoded reference frame in on-chip cache" 616, and ready for retrieval to be used as a reference for decoding the next (or other) compressed frame to be decoded. The decoded reference frame is placed and maintained in on-chip cache rather than off-chip non-cache temporary memory while it still may be used to decode other frames. It will be appreciated, however, when there are more reference frames than the space for those frames in the on-chip cache memory, the reference frames may be placed in the off-chip non-cache memory instead until the frames are directly fetched by the decoder or placed in cache when space becomes available. Other reasons that would cause the reference frames to be placed in non-cache memory despite the process described herein include contention for the cache from other hardware units resulting in cache thrashing.

Process 600 may include "read reference frame from on-chip cache rather than off-chip non-cache memory for decoding another frame" 618 to perform the inter-prediction operations of the pixel decoding. Since the reference frame is read from cache, this reduces delay and saves on off-chip non-cache (or RAM) memory capacity as well as memory transaction broadband to fetch the reference frame from the off-chip non-cache memory. The decoding is performed similarly to that already explained above to decode the reference or non-reference frame and further explanation is not needed.

Process 600 may include determining whether to "evict frame data from cache?" 618, and may be a decision to eliminate one or more cachelines holding the frame data. This may include determining which frame (or cacheline of a slice or frame) should be removed from on-chip cache to make room for a new reference frame to be placed into cache. One way to do this is to use a least recently used (LRU) algorithm which counts the number of uses for each reference in the cache over a certain recent time period, and then removes the least used references. Alternative methods may simply include a first-in, first-out (FIFO), not recently use (NRU), second-chance, Clock, or variations of any of these techniques, or many others to attempt to attain the best hit ratio on the references placed in the cache.

Whether or not the reference frame is to be evicted from the cache, process 600 then may include the test "more frames?" 622 to end the reference caching process or to obtain more frames as already described above with non-reference frames.

When the reference frame is to be removed from the on-chip cache memory, in addition to checking for more frames in the video sequence, process 600 also may include "flush frame from cache to off-chip non-cache memory" 626. Thus, when one of the algorithms mentioned above is used (such as LRU) and it is determined that the current reference frame should be removed from the on-chip cache memory, it is removed to the off-chip non-cache memory where frames are held in the off-chip DPB for further refinement, post-processing, and so forth with the non-reference frames as already described above.

Process 600 may include "page frame out of off-chip non-cache memory?" 628. Thereafter, it is determined whether the frames should be removed from the temporary off-chip non-cache memory and into non-volatile memory. This may be due to memory pressure (over-allocation of the memory), or as the frames are needed for playback or downloaded for storage. When this occurs, process 600 may include "page frame-out to non-volatile memory" 630. Thus, the frame data may be paged out (removed) from system memory (or other off-chip non-cache temporary memory) to non-volatile or permanent memory.

Figure 7B:
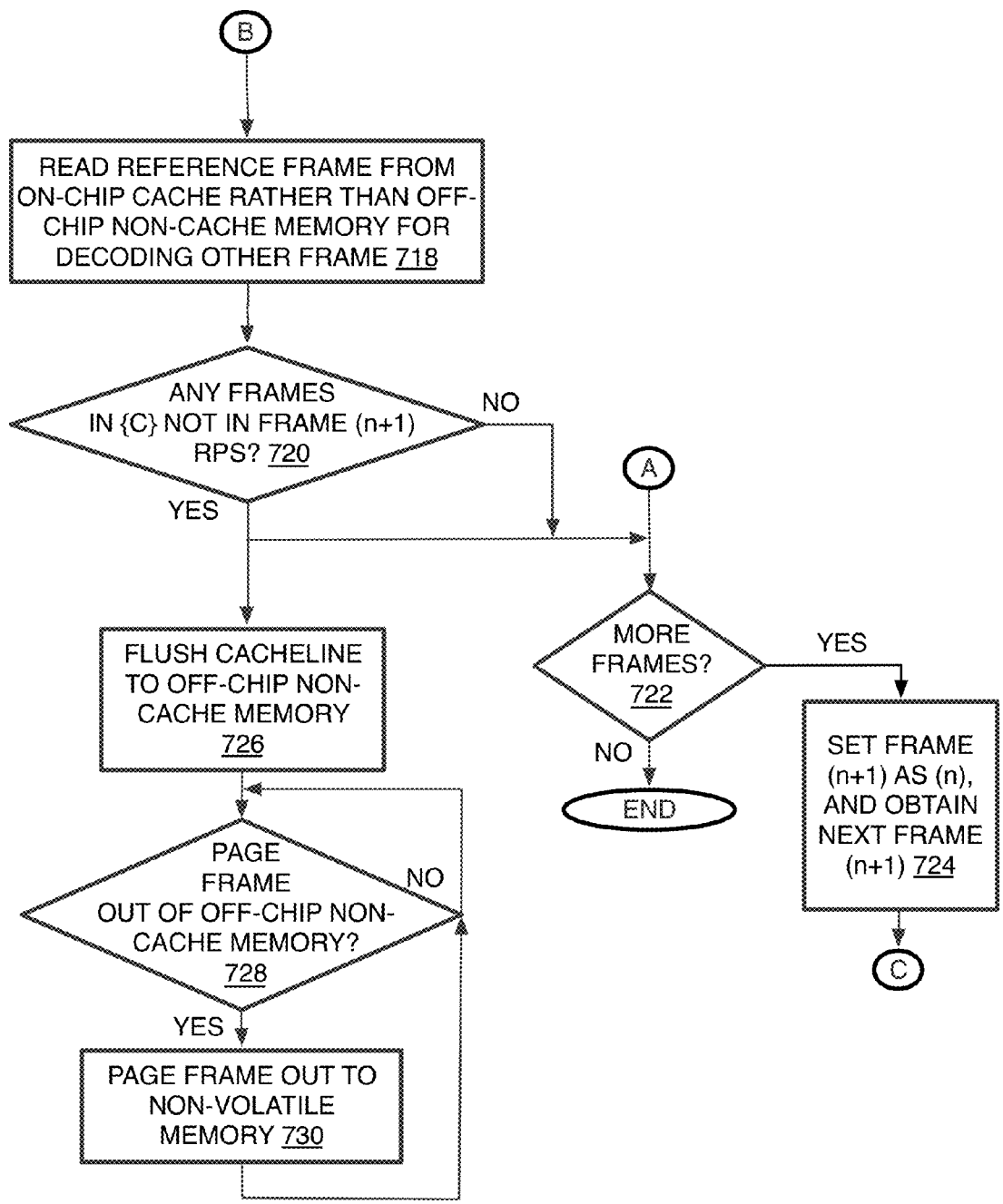

Referring now to FIGS. 7A-7B, a detailed example reference frame caching process 700 is arranged in accordance with at least some implementations of the present disclosure and for an HEVC codec format. In the illustrated implementation, process 700 may include one or more operations, functions or actions as illustrated by one or more of operations 702 to 730 numbered evenly. By way of non-limiting example, process 700 will be described herein with reference to operations discussed with respect to FIGS. 1-3, 5, 8-10, and 12-14, and may be discussed with reference to example systems 100, 200, 300, 500, 1200, 1300, and/or 1400 discussed herein.

Process 700 may include "obtain compressed image data having frames and reference indicators" 702, and as explained above, this includes pixel data of frames in a video sequence that may be used as reference frames, and particularly the luminance and chroma data, as well as motion vectors and any other data to reconstruct the frame. As to the reference indicator, as with the AVC format, the HEVC format also uses non-VCL data that forms an NAL and may include a sequence parameter set (SPS) that provides information about a sequence of frames, and a picture parameter set (PPS) that provides picture-specific data and may include information placed in the headers of the frames and individual slice headers that may indicate the motion of the image content between frames (or slices) and holds the codes for single frames. Relevant here, and usually for HEVC, nothing in the header unit (or Non-VCL syntax elements) of a current frame or current slice indicates whether that current frame is to be used as a reference frame. Instead, a reference picture set (RPS) that lists which frames are the references for the current frame (and other frames) is placed in the individual slice headers of the slices for the current frame. By one form, while the RPS may be different from frame to frame, each slice header of every slice of the same frame has a copy of the same RPS for resiliency. The RPS information can also be signaled in the sequence parameter set (SPS) and may be referenced by the slice headers. The RPS typically lists the frame display or picture order count (POC) for each frame but could list the decode order number (DON) instead. The RPS will signal the following four sets:

{RefPicSetStCurr, RefPicSetStFoll, RefPicSetLtCurr, RefPicSetLtFoll} so that when the RPS is in the header of a current frame, where St (short term) refers to the frame that is decoded just ahead of the current frame to be decoded (or when picture (or display) order is the same order as decode order, then the next past frame relative to the current frame and where past is toward the beginning of the video sequence). Likewise, Lt (long term) refers to reference frames farther ahead in decoding order than the single frame ahead mentioned for St. In terms of display (picture) order, this includes those frames farther in the past from the current frame than the next past frame (again, only when the POC is the same as the DON). Curr (current) refers to frames used as a reference frame for the current frame, and foll (follow) refers to frames used as reference frames to one or more of the following pictures yet to be decoded after the current picture is decoded. Together the four sets are the RPS of the frame.

Process 700 may include "extract frames (n) and (n+1) from image data" 704, and particularly, extract a current frame yet to be decoded as frame (n) and the next frame to be decoded after the current frame is decoded is set as frame (n+1). The variable 'n' may refer to the DON but also may be the POC when the display order is the same order as the decoding order, as explained below. Normally, the decoder will decode one frame at a time. So the operation here also may include parsing the headers (non VCL and VCL) NAL units to obtain the information for decoding. The parsed slice headers contain the RPS of each frame among other syntax elements as mentioned. The result or the parsing and extraction is compressed frames and non-VCL data including the RPS of the frames (or slices) being stored in off-chip non-cache temporary memory, such as temporary RAM, to be used for decoding.

Process 700 may include a test "frame (n) number in frame (n+1) RPS of frame?" 706. Particularly, this operation includes reading the RPS from future or next frame (n+1) in decoder order to determine whether the number (and either the DON or POC number of the frame for example) of a current frame (n) is on the RPS of frame (n+1) to determine whether frame (n) is a reference frame to frame (n+1) or other frames indicated by one of the RPS sets. By one form, this more precisely includes peeking at the RPS of a single slice of frame (n+1), which may be the first slice of frame (n+1) that is to be decoded or any other intentionally or randomly selected slice of frame (n+1). The determination (or indication) as to whether frame (n) is a reference then may be used to determine which memory (on-chip cache or off-chip non-cache) to place the frame (n).

In order to perform this read of the POCs (or other numbers) listed in the RPS of the frame (n+1) in HEVC, it is sufficient for the decoder or driver to delay the pixel decode processing by one frame and then check whether the current frame's POC (or other number) is in the RPS of the next frame. The delay is the delay in submitting the current frame for decoding. Particularly, and normally, the decoder can parse the current frame and then submit it immediately for processing. But in the present case, an extra operation to parse the slice header of a next frame is added. When the data is being streamed, the decoder will receive frame samples one at a time, and so hence there is a delay as it waits for the next sample. Using delay of a single frame is sufficient because the HEVC protocol is to remove the POC (or other) number from the RPSs once the frame of that number is no longer needed as a reference, and that frame will not be used again once it is retired. Another way to state this is that a reference frame, by its POC (or other number), may be listed in one of the RPS sets and a few times in consecutive frames while that reference frame is being used as a reference. Once the reference frame is no longer used as a reference, its number is retired from the RPS, and the reference frame will not be used again for that video sequence. This is true even if the reference frame is not actually used as a reference for consecutive frames. For example, and assuming POC=DON, frame (POC=1) may be a reference for POC frames 4 and 8. In this case, the POC number (1) still shows up under the RSP set for following frames (RefPicSetLtFoll) in current frame (POC=2 for example) even if the reference frame's POC number does not show up in the current (RefPicSetStCurr) RPS set for the current frame (POC=2). The POC number for the reference frame will not show up at all once the reference frame is no longer used as a reference after it is used to decode frame POC=8 for example. Thus, checking the RPS for each frame (and in one form, all RPS sets that form the RPS) will track the use of the reference frames and determine whether to place the frame in cache and how long to hold the frame in cache as discussed in detail below.

Figure 8:
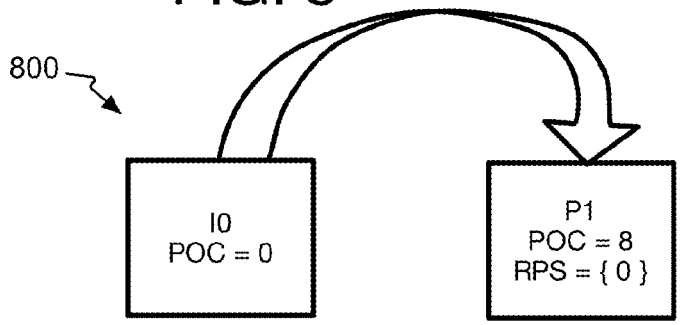
FIG. 8 is a schematic diagram of an example group of pictures used for a reference frame caching method for video coding.

Referring to FIG. 8, two frames in a GOP 800 are shown with an intra-coded frame I0 and a next prediction P-frame P1 in decoding order to exemplify the reading or peek of the RPS at the frame (n+1). In this example, the frame I0 has a POC=0 and may be considered the current frame (n) about to be decoded. Frame P1 with a POC=8 may be the next frame to be decoded and may be set as frame (n+1) so that the DON for these frames is 0 and 1 respectively. IN this case then, the decoding order is not the same as the display (or POC) order. The RPS at P1 includes the frame POC number {C}=0, referring to POC=0. Therefore, frame I0 is a reference frame for frame P1.

This example can be expanded as shown on table 3 below. Thus, frames I0 and P1 from GOP 800 may be part of an IBBBBBBBP group of pictures (GOP) for HEVC where B-frames can be reference frames. The table shows which frame POCs are listed in the RPS for each frame, and particularly, the frames in all of the four RPS sets described above. The table also shows which frames are in a cache of 512 MB when frames are about 95 MB so that up to five frames fit in the cache. Another row in Table 3 shows which frames are evicted from the cache and when, according to the implementations herein. For example, frame B3 (POC=2) uses frames 0, 4, and 8 (POC) as references so that when frame 4 (POC) is about to be decoded, the system peeks at the RPS of frame 2 (or at least a slice of frame 2), and it is determined that frame 4 is a reference frame for frame 2. Thus, frame 4 is placed in cache along with frames 0 and 8 before frame 2 is decoded. This is then repeated to determine whether frame 2 is a reference for frame 1, and then repeated for each frame. Note that frame 8 is not removed from the cache (and the POC 8 is not removed from the RPS) even though frame 1 does not use frame 8 as a reference and the curr (Current) RPS set would not recite POC 8 because the long term foll (follow) RPS sets will still recite the POC 8 to maintain frame 8 in the cache as long as it is being used as a reference. The eviction of the frames is explained in greater detail below. It should be noted that while table 3 lists frames, it also could apply to a single (or more) slices in the frames instead of an entire frame. In that case, the POC and DON numbers indicate the frame of the slice.

TABLE 3

Example GOP to explain reference picture sets:
EXAMPLE SEQUENCE IBBBBBBBP

| | Frame type (decoding order): | | | | | | | | | |
|---|---|---|---|---|---|---|---|---|---|---|
| | I0 | P1 | B2 | B3 | B4 | B5 | B6 | B7 | B8 | P9 | B10 |
| Output POC | 0 | 8 | 4 | 2 | 1 | 3 | 6 | 5 | 7 | 16 | 12 |
| Refs | | 0 | 0, 8 | 0, 4, 8 | 0, 2, 4 | 0, 2, 4, 8 | 2, 4, 8 | 0, 4, 6, 8 | 4, 6, 8 | 6, 8 | 6, 8, 16 |
| RPS | | 0 | 0, 8 | 0, 4, 8 | 0, 2, 4, 8 | 0, 2, 4, 8 | 0, 2, 4, 8 | 0, 4, 6, 8 | 0, 4, 6, 8 | 0, 4, 6, 8 | 8, 6, 16 |
| Cache | 0 | 0, 8 | 0, 4, 8 | 0, 2, 4, 8 | 0, 2, 4, 8 | 0, 2, 4, 8 | 0, 2, 4, 8 | 0, 4, 6, 8 | 0, 4, 6, 8 | 0, 4, 6, 8, 16 | 6, 8, 16, 12 |
| Evict from Cache | | | | | Not used as ref | | | 2 | | | 0, 4 | where numbers in bold show when (during which frame is being decoded) a frame is first added to and/or then evicted from cache.

By another example using table 3, when frame 1 (POC) is frame (n) (where n=4 DON or frame B4), and frame 3 (POC) is frame (n+1) (frame 5 DON or frame B5), then it can be seen that frame 1 (POC) is not a reference for frame 3 (POC). Since POC=1 does not show up in the RPS of the next frame (POC=3), it can be concluded that it is not a reference frame for any other frame either.

Returning to process 700, process 700 may include "do not mark frame (n) as cacheable reference" 708 when the frame is found not to be a reference frame. The frame then may be marked as a non-reference frame as explained above with operation 608, and will be placed in off-chip non-cache memory.

When a frame (n) is found to be a reference frame in the RPS of frame (n+1), process 700 may include "mark frame (n) as cacheable reference frame with writes to be cached during decoding" 710 so that the reference frame is moved to on-chip cache memory after it is decoded. The technique for performing the marking is described above with operation 610. The marking may occur just before or just after the reference frame is decoded.

Whether or not the reference indicator indicates the current frame is a reference frame, process 700 may include "decode frame" 712, and as described above with operation 612, the pixel decoder then may apply motion vectors and use the reference frames in the L2 cache, if any, to reconstruct the current reference frame (or non-reference frame) that is yet to be placed in on-chip cache or off-chip memory. Other details of pixel decoding are provided below with operation 716 to decode another or next frame while using this current frame as a reference frame fetched from on-chip cache.

When the decoded frame is a non-reference frame as indicated by the indicator, process 700 may include "place decoded non-ref. frame into off-chip non-cache memory" 714. As mentioned, this memory may be a temporary memory and type of RAM, DRAM, or DDR RAM to name a few examples. The non-reference frame may be considered to be placed in a decoded frame buffer formed by the off-chip memory and for non-reference frames and reference frames that are no longer being used. Also, as mentioned with operation 614, the non-reference frames still may be placed into cache for reasons other than to be used as a reference.

Once the reference frame is decoded, process 700 may include "place reference frame (n) in cache set {C}" 716, and particular place the reference frame in the on-chip cache memory such as L2 cache. A decoder can then fetch the reference frame from the on-chip cache when it is needed to decode a current frame being decoded. It will be appreciated, however, when there are more reference frames than the space for those frames in the on-chip cache memory, the reference frames may be placed in the off-chip non-cache memory instead until the frames are directly fetched by the decoder or placed in cache when space becomes available. As mentioned above with operation 616, other reasons exist that may cause the reference frames to be placed in non-cache memory despite operations herein.

Figure 9:
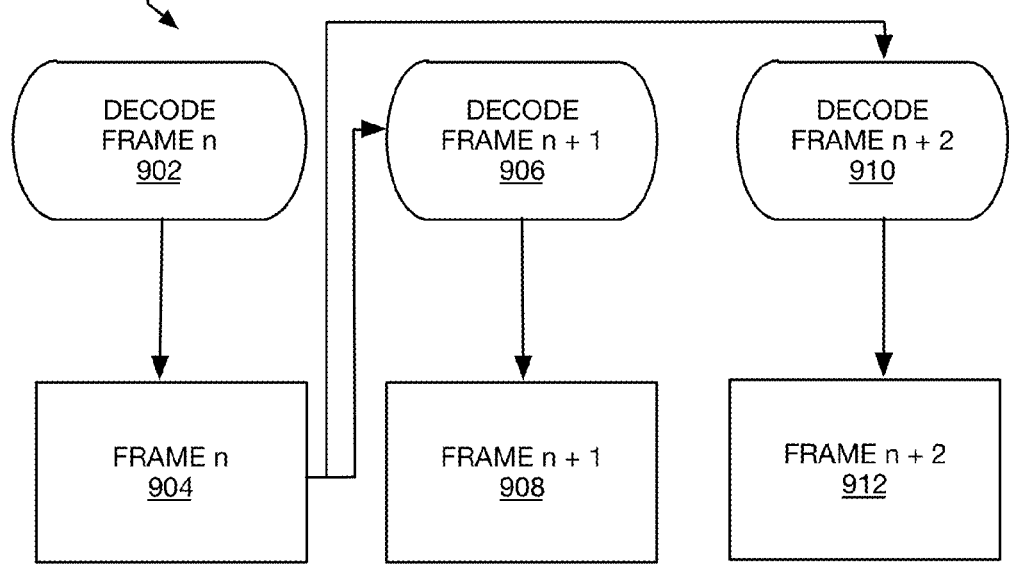
FIG. 9 is an illustrative diagram showing a reference frame reading and writing order for a reference frame caching method.

Referring to FIG. 9, a set 900 of frames used in the present reference frame caching process demonstrates the read bandwidth savings in the channels to the off-chip non-cache memory. Specifically, a frame n (902) is determined to be a reference frame and is decoded. Then, during or after decoding, the writes of the decoded frame n are placed into cache so that frame n (904) resides in the on-chip cache instead of being written to the off-chip memory. A decoder then may use frame n (904) to decode both a frame n+1 (906) and then a frame n+2 (910) by performing reference reads from the on-chip cache rather than the off-chip memory. If it is determined that both frames 906 and 908 are non-reference frames, the writes of these frames are not to the on-chip cache but to the off-chip memory instead to store frames 908 and 912 respectively. Thus, whenever a frame very likely will be used by the subsequent and near future frames as a reference, a read bandwidth equal to the size of this reference is saved at the channels to the off-chip non-cache memory each time the reference frame (904) is to be read as a reference (and here twice).

Process 700 may include "read reference frame from on-chip cache rather than off-chip non-cache memory for decoding other frame" 718. Accordingly, once the next frame is ready for pixel decoding, the decoder may determine which frames are the reference frames to the current frame separately from the determination made to perform the reference frame caching as mentioned with the decoding operation 612 and 712. Thus, the decoder may obtain the motion vectors and residuals along with reference frame indices, which may or may not use the RPS of the frames, to identify the reference frames for motion compensation to reconstruct the current frame or slice. Thus, when the decoder uses the slice headers to obtain reference frames, rather than purely computed form the motion vectors, the decoder may or may not need to reparse the next frame's slice headers when it decodes the next frame when it already has the RPS reading from the reference determination unit for example.

Also, the pixel decoder may search for the reference frames in the L2 cache, but if the fetch in the L2 cache results in a miss such as when there are more reference frames for a current frame than the capacity for the reference frames in the L2 cache, the identified reference frames may be fetched from other memory(ies). This may occur directly from non-cache memory for example. Thus, the pixel decoder still may be forced to attempt to fetch reference frames from the off-chip non-cache external temporary memory in this case. Otherwise, if there is sufficient time, the reference frame may be moved from the off-chip non-cache memory and to the on-chip cache when cache capacity becomes available and where it will wait for the decoder to fetch the reference frame.

Thereafter, process 700 may include a test "any frames in {C} not in frame (n+1) RPS?" 720. Thus, for HEVC, the system compares a list of the frames in the on-chip cache to the RPS of the frame (n+1). If there are any frames in the on-chip cache set {C} not on the RPS, those frames are no longer needed for use as reference frames (they are retired), and may be removed (or evicted) from the on-chip cache. Thus, with the one frame look ahead or peek to the RPS of frame (n+1), and by taking advantage of the fact that once a buffer is retired from an RPS it cannot be used anymore, the present process 700 can determine when a reference frame should be removed from the cache without having to guess or remove frames on the basis of memory pressure alone. The comparison between the RPS and the cache set {C} may be performed every frame, every nth frame, or other interval. This may open more cache capacity earlier to hold reference frames that are being used or will be used in the near future, thereby increasing the cache hit rate, and reducing delay, and so forth. This can be performed when the memory system provides this level of control such as programming that indicates that the priority of cachelines for eviction should be high for cachelines for a specific buffer.

Figure 10:
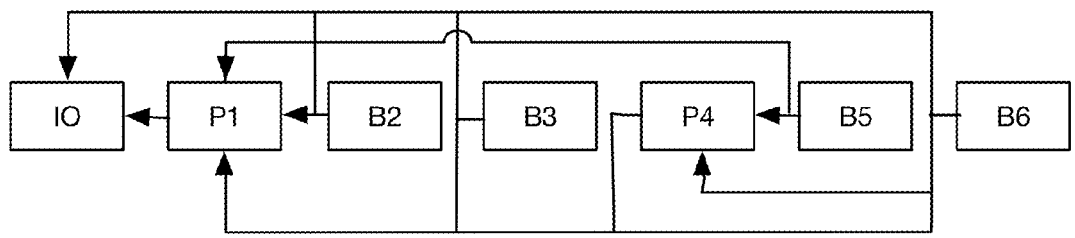
FIG. 10 is a schematic diagram of an example group of pictures for a reference frame caching method for video coding.

Referring to FIG. 10, a group of pictures (GOP) 1000 may be used to demonstrate a decrease in read bandwidth on the channels to the off-chip non-cache memory due to a substantial increase in cache hits as a result from using the present reference caching process 700. GOP 1000 may have a IPBBP pattern where B frames are not reference frames and shows six frames in decoding order 0 to 6 (I0 to B6). It should be noted that the POC is the same as decoding order here since the P frames do not need to change their order from POC to DON. Arrows on the GOP 1000 lead from a frame to be decoded and to that frame's reference frames. Table 4 below lists the reference frames for each frame, and then compares the caching when all frames are cached to the caching that occurs in the present method. For both of these, the frames in cache and the reference frame cache misses are shown.

TABLE 4

Example GOP to show read bandwidth reduction

| Frame | Reference Frames | Cache All Frames | | Cache Reference Frames Only | |
|---|---|---|---|---|---|
| | | Frames in Cache | Reference Frame Cache Miss | Frames in Cache | Reference Frame Cache Miss |
| I0 | | | | | |
| P1 | I0 | I0 | | I0 | |
| B2 | I0, P1 | I0, P1 | | I0, P1 | |
| B3 | I0, P1 | P1, B2 | I0 | I0, P1 | |
| P4 | P1 | B2, B3 | P1 | I0, P1 | |
| B5 | P1, P4 | B3, P4 | P1 | P1, P4 | P4 |
| B6 | I0, P1, P4 | P4, B5 | I0, P1 | P1, P4 | I0 |
| Total Read Bandwidth (MB/Frame) | | | 475 | | 190 |

It is assumed that the decoded frames are 125 MB in size, two frames can fit into the cache, and eviction is based on Least Recently Used (LRU) algorithms. It can be observed that under LRU in this example, the LRU algorithms act like FIFO when only two frames can fit in the cache. This results in five cache misses for a read bandwidth of 475 MB/frame to obtain the correct frame from non-cache memory when all frames are cached. In contrast, with the present method such as by peeking at the RPS of the next frame before determining whether to place the current frame in cache, this method maintains the needed reference frames in the cache longer thereby resulting in a greater number of cache hits. Here, there are only two misses, for 190 MB/frame to fetch the correct frame from the non-cache memory. In this example, and given the cache size constraint, selectively caching the reference frames according to the present method realizes a 60% drop in read bandwidth.

It will be understood that the system writes each frame to non-cache memory (such as off-chip DRAM) eventually when the frame gets evicted from the cache, and therefore there is no write savings.

Thereafter, whether or not the stored frame is a reference frame, process 700 may include a test "more frames?" 722 to determine whether or not to continue the reference caching process. Thus, by one form, the process first checks to determine whether there is another frame in the video sequence. When there is another frame, process 700 includes "set frame (n+1) as frame (n), and obtain next frame (n+1)" 724, where n is in decode order, and loops to operation 706 to analyze the next frame. If there is no other frame, then the reference caching process ends and further image data processing, storage, re-encoding, display, and/or transmission may continue.

In addition to checking whether the video sequence has more frames, and when it is decided that the reference frame should be removed from the on-chip cache, process 700 may include "flush cacheline to off-chip non-cache memory" 726, a test "page frame out of off-chip non-cache memory?" 728, and then finally, "page frame out to non-volatile memory" 730, which are all similar to operations 626, 628, and 630 already described with process 600 which applies equally here.

In addition to the off-chip memory bandwidth savings and possible size reduction (or increase in efficiency), the reference caching approach results in more latency tolerance since significantly more of the requests from the video decoder IP (with L1) will be met by on-chip L2 cache due to a high cache hit. In other words, since the L2 cache hits will be significantly more frequent resulting in very significant time savings due to fewer off-chip memory fetches, the time savings can be used for other reference frame fetches from the off-chip memory or other tasks. This will thereby significantly reduce the latency impact of accessing the off-chip memory.

Figure 11:
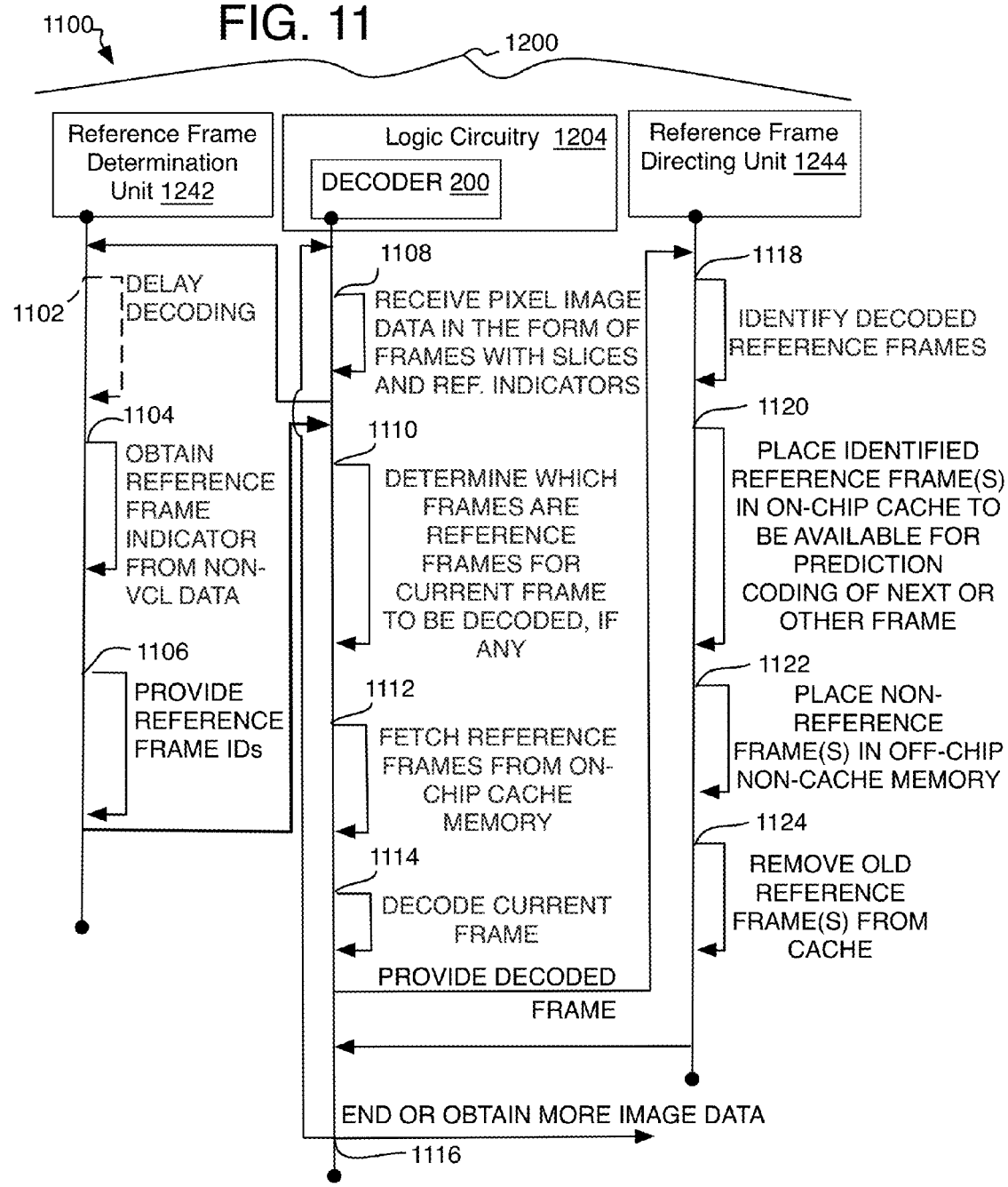
FIG. 11 is an illustrative diagram of an example system in operation for a method of reference frame caching for video coding.

Referring now to FIG. 11, system 1200 may be used for an example reference frame caching process 1100 for video coding shown in operation, and arranged in accordance with at least some implementations of the present disclosure. In the illustrated implementation, process 1100 may include one or more operations, functions, or actions as illustrated by one or more of actions 1102 to 1124 numbered evenly, and used alternatively or in any combination. By way of non-limiting example, process 1100 will be described herein with reference to operations discussed with respect to any of the implementations described herein.

Figure 12:
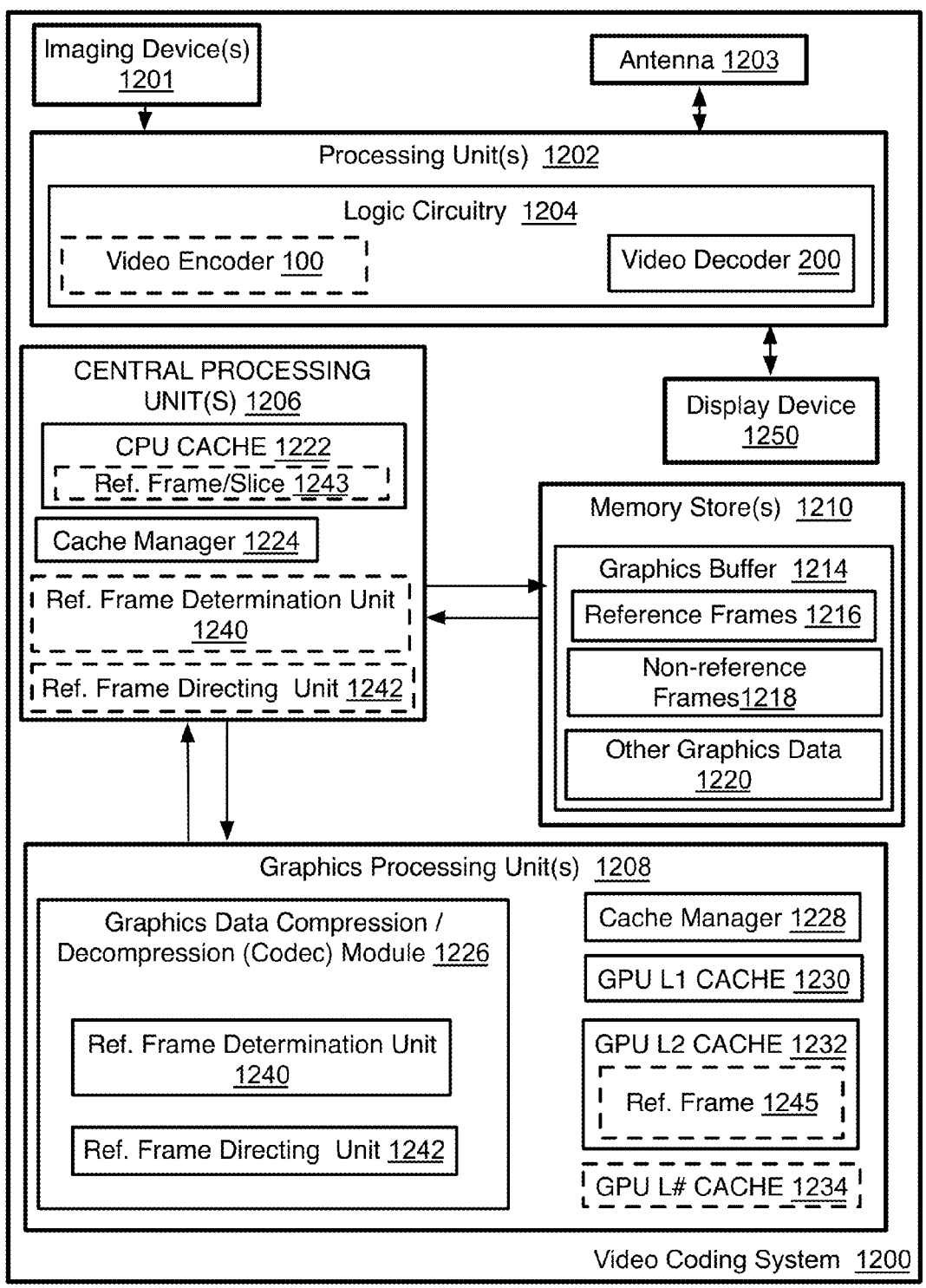
FIG. 12 is a diagram of an example system.

In the illustrated implementation, system 1200 may include a processing unit 1202 with logic units or logic circuitry or modules 1204, the like, and/or combinations thereof. For one example, logic circuitry or modules 1204 may include the video decoder 200 and/or video encoder 100 either with inter-prediction functionality. Also, the system 1200 may have a central processing unit 1206 and/or graphics processing unit 1208 as shown here with a graphics data compression and/or decompression (codec) module 1226. Relevant here, the graphics module 1226 may have a reference frame determination unit 1240 and a reference frame directing unit 1242. The system 1200 also may use off-chip or external memory 1210, such as DRAM or other types of RAM or temporary memory, to at least store a graphics buffer 1214 holding reference frames 1216 (after their use to decode other frames is complete for example), non-reference frames 1218, and other graphics data 1220 including coefficients, reference indicators as described herein, and/or other overhead data. The graphics unit 1208 also may have a cache manager 1228, and at least L1 and L2 cache memory locations 1232 and 1234 where the reference frames 1245 may be uploaded to the L2 cache depending on the determination unit 1240 and directing unit 1242. Optionally, the central processing unit 1206 may have the reference caching units and cache instead of, or in addition to, the graphics processing unit as shown on system 1200. Although system 1200, as shown in FIG. 12, may include one particular set of operations or actions associated with particular modules or units, these operations or actions may be associated with different modules than the particular module or unit illustrated here.

Starting at the decoder 200, process 1100 may include "receive pixel image data in the form of frames with slices and reference indicators" 1108, and as already described above, this may include non-VCL data in the form of nal units that include a reference indicator in the slice headers such as the nal_ref_idc syntax element code for AVC format and that may be 1 or non-zero to indicate a frame is a reference frame. Otherwise, for HEVC the reference indicator may be the RPS that is placed in the slice headers. The former indicates whether the current frame with the slice header information is a reference frame, and the latter indicates which other frames are reference frames for the frame that has the RPS in its slice header. It will be understood that other variations of non-VCL data may be used as well.

Process 1100 may include "delay decoding" 1102, and particularly for HEVC systems, the decoding of a current frame may be delayed so that the RPS at at least one slice header of the next frame to be decoded after the current frame may be read as described above.

Thus, process 1100 then may include "obtain reference frame indicator from non-VCL data" 1104, and as mentioned that is the code for the nal_ref_idc or other nal unit or non-VCL type of unit of the current frame, or by peeking at the frame numbers (such as POCs or DONs) of an RPS of the next frame to be decoded after the current frame, or the peek could be in other future frames such as peeking at every other frame or other interval.

Process 1100 may include "provide reference frame IDs" 1106, and specifically, as mentioned above by marking which frames are reference frames and which frames are non-reference frames. The marked frames, when performed before decoding, then may be provided to the decoder for pixel decoding, but otherwise may be provided to the directing unit to direct the frames to the appropriate memory after decoding as described herein.

Process 1100 may include "determine which frames are reference frames for a current frame to be decoded, if any" 1110. For this operation, and to decode the current frame, which may be a reference frame itself, the decoder may need to obtain other reference frames from the on-chip cache memory to decode the current frame. As mentioned above, the decoder may or may not use the same reference indicators to determine which frames are reference frames for motion compensation. Thus, for example, the motion vector data may include the identification of reference frames, and or other indices that are separate from the RPSs. By another form, the decoder also may use the RPSs to determine which frames to fetch for motion compensation.

Process 1100 may include "fetch reference frames from on-chip cache memory" 1112, and involves fetching the reference frames that were placed in the cache in the first place by the use of the reference indicators. Also as mentioned above, however, the decoder may identify and use reference frames from other memory(ies) when an L2 cache miss occurs for coding of the current frame. If a miss occurs, the system then looks elsewhere for the reference frames, such as in the off-chip non-cache memory (or temporary memory).

Process 1100 may include "decode current frame" 1114, where the decoder performs the decoding including the motion compensation that requires the reference frames.

The process 1100 then may provide the decoded frame to the reference frame directing unit, or more precisely, provide access to the destination address for the data of the decoded frame (or slices) once it is decoded. Then, process 1100 may include "identify decoded reference frames" 1118, and the directing unit will look to see which frames are marked as reference frames and which are not. Then, process 1100 may include "place identified reference frame(s) in on-chip cache to be available for prediction coding of next or other frame" 1120, and without placing the reference frame in off-chip temporary memory, at least at first. Thus, by one form, the reference frames (or slice by slice of a frame) is placed in the L2 cache.

Process 1100 may include "place non-reference frame(s) in off-chip non-cache memory" 1122, and in one form, without placing the non-reference frame in on-chip cache memory at least for the purpose of waiting to be used as a reference frame for decoding. As mentioned above, the non-reference frame eventually may be placed in cache for other reasons such as post-processing or preparation for display, and so forth.

Process 1100 may include "remove old reference frame(s) from cache" 1124, and as mentioned herein, this may be due to memory pressure, certain efficiency algorithms such as LRU, FIFO, or others, or for HEVC protocol, this may be due to the peek at the RPS where the system can determine exactly when a reference frame is no longer used as a reference frame (it is retired) and should be removed from the cache. Thus, when a list of frames in the cache is compared to the RPS of the next frame after a current frame about to be decoded, any frames in the cache missing from the RPS should be removed from the cache, and in most cases, the removal is performed after the current frame is decoded.

Process 1100 may include "end or obtain more image data" 1116. When the decoding of the current frame is complete, if there are more frames in the video sequence, process 1100 then may include looping back to operation 1108 to obtain more image data and reconstruct the next current frame. Otherwise, if the end of the image is reached, process 1100 is complete, and other processing may occur as described above.

While implementation of example process 400, 600, 700 and/or 1100 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as DRAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 12, an example video coding system 1200 for adaptive reference frame caching may be arranged in accordance with at least some implementations of the present disclosure. In the illustrated implementation, system 1200 may include one or more central processing units or processors 1206, an imagining device(s) 1201 to capture images, an antenna 1203, a display device 1250, and one or more off-chip or external memory stores 1210. Central processing units 1206, off-chip or external memory store 1210, and/or display device 1250 may be capable of communication with one another, via, for example, a bus, wires, or other access. In various implementations, display device 1250 may be integrated in system 1200 or implemented separately from system 1200.

As shown in FIG. 12, and discussed above, the processing unit 1202 may have logic circuitry 1204 with an encoder 100 and/or a decoder 200. The video encoder 100 may have a decoding loop with a pixel decoder or motion compensation unit, and the decoder 200 may have a pixel decoder or motion compensation unit, as well as other components as described above. Further, either CPU 1206 or a graphics processing unit 1208 may have a graphics data compression and/or decompression (codec) module 1226. This module 1226 may have a reference frame determination unit 1240 and a reference frame directing unit 1242. The graphics processing unit, CPU, or other unit also may have a cache manager 1228 (or 1224), L1 cache 1230, on-chip or local L2 cache 1232 (or 1222) that holds the reference frames 1245 (or 1243), and may have other caches L #1234 (where in any of the cache may be considered as on-chip (or on-board or local) to the processor. These components provide many of the functions described herein.

As will be appreciated, the modules illustrated in FIG. 12 may include a variety of software and/or hardware modules and/or modules that may be implemented via software or hardware or combinations thereof. For example, the modules may be implemented as software via processing units 1202 or the modules may be implemented via a dedicated hardware portion on CPU(s) 1206 or GPU(s) 1208 (which may or may not include image signal processors (ISPs). The L2 cache 1222 and 1232 may be implemented as embedded DRAM (or eDRAM) or any other future memory hierarchy technology. Furthermore, the non-cache memory stores 1210 may be shared memory for processing units 1202, for example. The graphics buffer 1214 may include reference frames 1216, motion vector data 1218, and other graphics data 1220 stored on DDR DRAM remote from the L2 cache on the processors 1206 or 1208 by one example, or may be stored elsewhere. Also, system 1200 may be implemented in a variety of ways. For example, system 1200 (excluding display device 1250) may be implemented as a single chip or device having a graphics processor, a quad-core central processing unit, and/or a memory controller input/output (I/O) module. In other examples, system 1200 (again excluding display device 1250) may be implemented as a chipset.

Processor(s) 1206 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 1210 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1210 also may be implemented to operate similar to a cache memory in addition to the on-chip or internal L2 cache 1232. In various examples, system 1200 may be implemented as a chipset or as a system on a chip (excluding off-chip memory 1210).

In various implementations, the example image processing system 1200 may use the imaging device 1201 to form or receive captured image data. This can be implemented in various ways. Thus, in one form, the image processing system 1200 may be one or more digital cameras or other image capture devices, and imaging device 1201, in this case, may be the camera hardware and camera sensor software, module, or component 1204. In other examples, imaging processing system 1200 may have an imaging device 1201 that includes or may be one or more cameras, and logic modules 1204 may communicate remotely with, or otherwise may be communicatively coupled to, the imaging device 1201 for further processing of the image data.

Thus, image processing device 1200 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 1201 may include camera hardware and optics including one or more sensors as well as auto-focus, zoom, aperture, ND-filter, auto-exposure, flash, and actuator controls. The imaging device 1201 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 1801 may be provided with an eye tracking camera.

Otherwise, the imaging device 1201 may be any other device that records, displays or processes digital images such as video game panels or consoles, set top boxes, and so forth.

As illustrated, any of these components may be capable of communication with one another and/or communication with portions of logic modules 1204 and/or imaging device 1201. Thus, processors 1206 or 1208 may be communicatively coupled to both the image device 1201 and the logic modules 1204 for operating those components. By one approach, although image processing system 1200, as shown in FIG. 12, may include one particular set of blocks or actions associated with particular components or modules, these blocks or actions may be associated with different components or modules than the particular component or module illustrated here.

Figure 13:
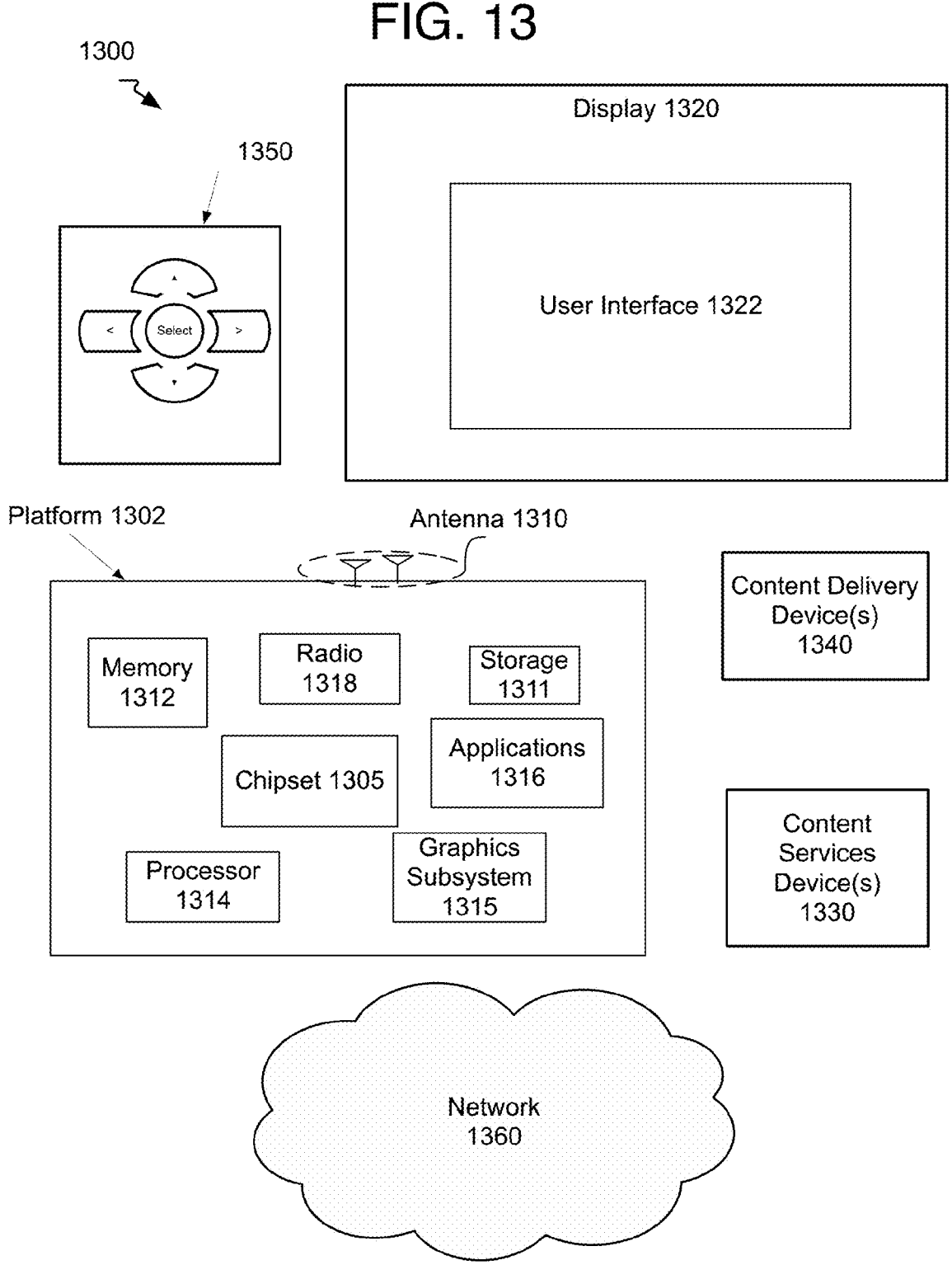
FIG. 13 is an illustrative diagram of another example system.

Referring to FIG. 13, an example system 1300 in accordance with the present disclosure and various implementations, may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1300 includes a platform 1302 communicatively coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1314, memory 1312, storage 1311, graphics subsystem 1315, applications 1316 and/or radio 1318 as well as antenna(s) 1310. Chipset 1305 may provide intercommunication among processor 1314, memory 1312, storage 1311, graphics subsystem 1315, applications 1316 and/or radio 1318. For example, chipset 1305 may include a storage adapter (not depicted) capable of providing intercommunication with storage 1311.

Processor 1314 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1314 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1311 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1314 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
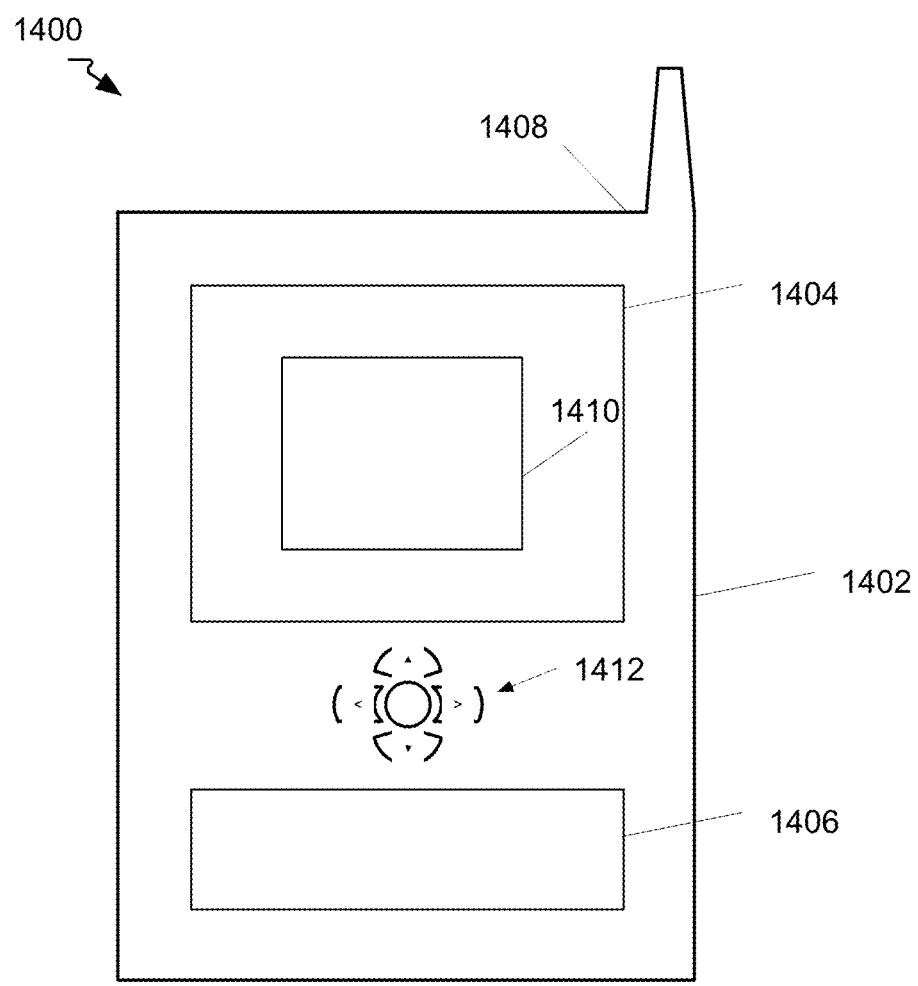
FIG. 14 illustrates another example device, all arranged in accordance with at least some implementations of the present disclosure.

As described above, system 1200 or 1300 may be implemented in varying physical styles or form factors. FIG. 14 illustrates implementations of a small form factor device 1400 in which system 1200 or 1300 may be implemented. In implementations, for example, device 1400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing 1402, a display 1404, an input/output (I/O) device 1406, and an antenna 1408. Device 1400 also may include navigation features 1412. Display 1404 may include any suitable screen 1410 on a display unit for displaying information appropriate for a mobile computing device. I/O device 1406 may include any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The implementations are not limited in this context.

Various implementations may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By one example, a computer-implemented method of reference frame caching for video coding comprises receiving image data comprising compressed frames of a video sequence and indicators of a non-video coding layer (non-VCL) type of element that indicate which one or more of the frames are reference frames to be used to decode one or more of the frames; storing decoded frames indicated as reference frames by the indicator and into on-chip cache memory and not in off-chip non-cache memory while using the reference frames to decode the one or more other frames; and placing decoded non-reference frames into off-chip non-cache memory so that the non-reference frames are not stored in on-chip cache memory to wait to be used as a reference frame, wherein frames are indicated as non-reference frames by the indicator.

By another implementation, the method may include that wherein the individual frames are formed of multiple slices, and wherein the indicator of a frame is obtained from at least one slice header; wherein the same indicator is provided in multiple slice headers of a frame; wherein the indicator for a frame is obtained from a single slice header; wherein individual indicators are obtained from a place in the image data associated with a single frame, and wherein at least one of: (1) individual indicators indicate whether or not the single frame is a reference frame to one or more other frames; wherein the indicator is the value for a network abstraction layer (NAL) unit; and wherein the indicator is the value for the NAL unit nal_ref_idc; and (2) wherein individual indicators are obtained from a place in the image data associated with a single frame and indicates which one or more other frames are reference frames to the single frame; wherein the indicator is a reference picture set (RPS) obtained from the image data at a place associated with a single frame and having a list of one or more frame numbers of one or more other frames that are reference frames to the single frame.

The method of option (2) also may comprise reading the RPS of the next frame to be decoded after a decoding of a current frame to determine whether the current frame is a reference frame to the next frame or other frames; delaying the decoding of the current frame to read the RPS of the next frame; removing a reference frame from on-chip cache memory depending on the indicator; and removing a reference frame from on-chip cache memory when a number of the reference frame no longer appears in an RPS after appearing in at least one or more RPSs.

By other approaches, a computer-implemented system that has a display, at least one on-chip cache memory, at least one off-chip non-cache memory, at least one processor communicatively coupled to the memories and the display, a reference determination unit operated by the at least one processor and to: receive image data comprising compressed frames of a video sequence and indicators of a non-video coding layer (non-VCL) type of element that indicate which one or more of the frames are reference frames to be used to decode one or more of the frames; and a reference frame directing unit operated by the at least one processor and to: store decoded frames indicated as reference frames by the indicator and into on-chip cache memory and not in off-chip non-cache memory while using the reference frames to decode the one or more other frames; and place decoded non-reference frames into off-chip non-cache memory so that the non-reference frames are not stored in on-chip cache memory to wait to be used as a reference frame, wherein frames are indicated as non-reference frames by the indicator.

By other approaches, the system may wherein the individual frames are formed of multiple slices, and wherein the indicator of a frame is obtained from at least one slice header; wherein the same indicator is provided in multiple slice headers of a frame; wherein the indicator for a frame is obtained from a single slice header; wherein individual indicators are obtained from a place in the image data associated with a single frame, and wherein at least one of: (1) individual indicators indicate whether or not the single frame is a reference frame to one or more other frames; wherein the indicator is the value for a network abstraction layer (NAL) unit; and wherein the indicator is the value for the NAL unit nal_ref_idc; and (2) wherein individual indicators are obtained from a place in the image data associated with a single frame and indicates which one or more other frames are reference frames to the single frame; wherein the indicator is a reference picture set (RPS) obtained from the image data at a place associated with a single frame and having a list of one or more frame numbers of one or more other frames that are reference frames to the single frame.

Also, under option (2), the reference determination unit is arranged to: read the RPS of the next frame to be decoded after a decoding of a current frame to determine whether the current frame is a reference frame to the next frame or other frames; and delay the decoding of the current frame to read the RPS of the next frame; and while the reference frame directing unit being arranged to: remove a reference frame from on-chip cache memory depending on the indicator; and remove a reference frame from on-chip cache memory when a number of the reference frame no longer appears in an RPS after appearing in at least one or more RPSs.

By one approach, at least one computer readable medium having stored thereon instruction that when executed cause the computing device to: receive image data comprising compressed frames of a video sequence and indicators of a non-video coding layer (non-VCL) type of element that indicate which one or more of the frames are reference frames to be used to decode one or more of the frames; store decoded frames indicated as reference frames by the indicator and into on-chip cache memory and not in off-chip non-cache memory while using the reference frames to decode the one or more other frames; and place decoded non-reference frames into off-chip non-cache memory so that the non-reference frames are not stored in on-chip cache memory to wait to be used as a reference frame, wherein frames are indicated as non-reference frames by the indicator.

By a further approach, the instructions may cause the computing device to wherein the individual frames are formed of multiple slices, and wherein the indicator of a frame is obtained from at least one slice header; wherein the same indicator is provided in multiple slice headers of a frame; wherein the indicator for a frame is obtained from a single slice header; wherein individual indicators are obtained from a place in the image data associated with a single frame, and wherein at least one of: (1) individual indicators indicate whether or not the single frame is a reference frame to one or more other frames; wherein the indicator is the value for a network abstraction layer (NAL) unit; and wherein the indicator is the value for the NAL unit nal_ref_idc; and (2) wherein individual indicators are obtained from a place in the image data associated with a single frame and indicates which one or more other frames are reference frames to the single frame; wherein the indicator is a reference picture set (RPS) obtained from the image data at a place associated with a single frame and having a list of one or more frame numbers of one or more other frames that are reference frames to the single frame.

As part of option (2), the instructions also may cause the computing device to: read the RPS of the next frame to be decoded after a decoding of a current frame to determine whether the current frame is a reference frame to the next frame or other frames; delay the decoding of the current frame to read the RPS of the next frame; remove a reference frame from on-chip cache memory depending on the indicator; and remove a reference frame from on-chip cache memory when a number of the reference frame no longer appears in an RPS after appearing in at least one or more RPSs.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:
1. A computer-implemented method of reference frame caching for video coding comprising:
  receiving image data comprising compressed frames of a video sequence and indicators of a non-video coding layer (non-VCL) type of element that indicate which one or more of the frames are inter-prediction reference frames to be used to decode one or more of the frames;
  directly after reconstructing decoded frames, storing the decoded frames indicated as the reference frames by the indicator and into on-chip cache memory and not in off-chip non-cache memory while using the reference frames to decode the one or more other frames; and
  placing decoded non-reference frames into off-chip non-cache memory so that the non-reference frames are not stored in on-chip cache memory to wait to be used as a reference frame, wherein frames are indicated as non-reference frames by the indicator.
2. The method of claim 1 wherein the individual frames are formed of multiple slices, and wherein the indicator of a frame is obtained from at least one slice header.

3. The method of claim 2 wherein the same indicator is provided in multiple slice headers of a frame.

4. The method of claim 2 wherein the indicator for a frame is obtained from a single slice header.

5. The method of claim 1 wherein individual indicators are obtained from a place in the image data associated with a single frame and indicates whether or not the single frame is a reference frame to one or more other frames.

6. The method of claim 1 wherein the indicator is the value for a network abstraction layer (NAL) unit.

7. The method of claim 6 wherein the indicator is the value for the NAL unit nal_ref_idc.

8. The method of claim 1 wherein individual indicators are obtained from a place in the image data associated with a single frame and indicates which one or more other frames are reference frames to the single frame.

9. The method of claim 1 wherein the indicator is a reference picture set (RPS) obtained from the image data at a place associated with a single frame and having a list of one or more frame numbers of one or more other frames that are reference frames to the single frame.

10. The method of claim 1 comprising reading the RPS of the next frame to be decoded after a decoding of a current frame to determine whether the current frame is a reference frame to the next frame or other frames.

11. The method of claim 10 comprising delaying the decoding of the current frame to read the RPS of the next frame.

12. The method of claim 1 comprising removing a reference frame from on-chip cache memory depending on the indicator.

13. The method of claim 1 comprising removing a reference frame from on-chip cache memory when a number of the reference frame no longer appears in an RPS after appearing in at least one or more RPSs.

14. The method of claim 1 wherein the individual frames are formed of multiple slices, and wherein the indicator of a frame is obtained from at least one slice header;
wherein the same indicator is provided in multiple slice headers of a frame;
wherein the indicator for a frame is obtained from a single slice header;
wherein individual indicators are obtained from a place in the image data associated with a single frame, and wherein at least one of:
(1) individual indicators indicate whether or not the single frame is a reference frame to one or more other frames; wherein the indicator is the value for a network abstraction layer (NAL) unit; and wherein the indicator is the value for the NAL unit nal_ref_idc; and
(2) wherein individual indicators are obtained from a place in the image data associated with a single frame and indicates which one or more other frames are reference frames to the single frame; wherein the indicator is a reference picture set (RPS) obtained from the image data at a place associated with a single frame and having a list of one or more frame numbers of one or more other frames that are reference frames to the single frame; and the method comprising:
reading the RPS of the next frame to be decoded after a decoding of a current frame to determine whether the current frame is a reference frame to the next frame or other frames;
delaying the decoding of the current frame to read the RPS of the next frame;
removing a reference frame from on-chip cache memory depending on the indicator; and
removing a reference frame from on-chip cache memory when a number of the reference frame no longer appears in an RPS after appearing in at least one or more RPSs.

15. A computer-implemented system comprising:
at least one display;
at least one on-chip cache memory;
at least one off-chip non-cache memory;
at least one processor communicatively coupled to the memories and display; and
a reference determination unit operated by the at least one processor and to:
receive image data comprising compressed frames of a video sequence and indicators of a non-video coding layer (non-VCL) type of element that indicate which one or more of the frames are inter-prediction reference frames to be used to decode one or more of the frames; and
a reference frame directing unit operated by the at least one processor and to:
directly after reconstructing decoded frames, store the decoded frames indicated as the reference frames by the indicator and into on-chip cache memory and not in off-chip non-cache memory while using the reference frames to decode the one or more other frames; and
place decoded non-reference frames into off-chip non-cache memory so that the non-reference frames are not stored in on-chip cache memory to wait to be used as a reference frame, wherein frames are indicated as non-reference frames by the indicator.

16. The system of claim 15 wherein the individual frames are formed of multiple slices, and each slice has a header that holds the same indicator, and wherein the indicator of a frame is obtained from a single slice header of the frame.

17. The system of claim 15 wherein individual indicators are at least one of:
obtained from a place in the image data associated with a single frame and indicates whether or not the single frame is a reference frame to one or more other frames, wherein the indicator is the value for the NAL unit nal_ref_idc, and
obtained from a place in the image data associated with a single frame and indicates which one or more other frames are reference frames to the single frame.

18. The system of claim 15 wherein the indicator is a reference picture set (RPS) obtained from the image data at a place associated with a single frame and having a list of one or more frame numbers of one or more other frames that are reference frames to the single frame; wherein the RPS of the next frame to be decoded after a decoding of a current frame is read to determine whether the current frame is a reference frame to the next frame or other frames.

19. The system of claim 18 wherein the decoding of the current frame is delayed to read the RPS of the next frame.

20. The system of claim 15 wherein the reference frame directing unit is arranged to remove a reference frame from on-chip cache memory depending on the indicator.

21. The system of claim 20 wherein the indicator is an RPS that includes numbers of those frames that are reference frames, and the reference frame directing unit is arranged to remove those frames from the on-chip cache memory that are not listed on an RPS of a frame to be decoded.

22. The system of claim 21 wherein the RPS that is compared to the frames in the cache is the RPS of a frame to be decoded next directly after a current frame is to be decoded.

23. The system of claim 15 wherein the individual frames are formed of multiple slices, and wherein the indicator of a frame is obtained from at least one slice header;
wherein the same indicator is provided in multiple slice headers of a frame;
wherein the indicator for a frame is obtained from a single slice header;
wherein individual indicators are obtained from a place in the image data associated with a single frame, and wherein at least one of:
(1) individual indicators indicate whether or not the single frame is a reference frame to one or more other frames; wherein the indicator is the value for a network abstraction layer (NAL) unit; and wherein the indicator is the value for the NAL unit nal_ref_idc; and
(2) wherein individual indicators are obtained from a place in the image data associated with a single frame and indicates which one or more other frames are reference frames to the single frame; wherein the indicator is a reference picture set (RPS) obtained from the image data at a place associated with a single frame and having a list of one or more frame numbers of one or more other frames that are reference frames to the single frame; and the reference determination unit being arranged to:
read the RPS of the next frame to be decoded after a decoding of a current frame to determine whether the current frame is a reference frame to the next frame or other frames; and
delay the decoding of the current frame to read the RPS of the next frame; and the reference frame directing unit being arranged to:
remove a reference frame from on-chip cache memory depending on the indicator; and
remove a reference frame from on-chip cache memory when a number of the reference frame no longer appears in an RPS after appearing in at least one or more RPSs.

24. At least one non-transitory computer-readable medium having stored thereon instructions that when executed cause a computing device to:
receive image data comprising compressed frames of a video sequence and indicators of a non-video coding layer (non-VCL) type of element that indicate which one or more of the frames are inter-prediction reference frames to be used to decode one or more of the frames;
directly after reconstructing decoded frames, store the decoded frames indicated as reference frames by the indicator and into on-chip cache memory and not in off-chip non-cache memory while using the reference frames to decode the one or more other frames; and
place decoded non-reference frames into off-chip non-cache memory so that the non-reference frames are not stored in on-chip cache memory to wait to be used as a reference frame, wherein frames are indicated as non-reference frames by the indicator.

25. The computer-readable medium of claim 24 wherein the individual frames are formed of multiple slices, and wherein the indicator of a frame is obtained from at least one slice header;
wherein the same indicator is provided in multiple slice headers of a frame;
wherein the indicator for a frame is obtained from a single slice header;
wherein individual indicators are obtained from a place in the image data associated with a single frame, and wherein at least one of:
(1) individual indicators indicate whether or not the single frame is a reference frame to one or more other frames; wherein the indicator is the value for a network abstraction layer (NAL) unit; and wherein the indicator is the value for the NAL unit nal_ref_idc; and
(2) wherein individual indicators are obtained from a place in the image data associated with a single frame and indicates which one or more other frames are reference frames to the single frame; wherein the indicator is a reference picture set (RPS) obtained from the image data at a place associated with a single frame and having a list of one or more frame numbers of one or more other frames that are reference frames to the single frame; and wherein the instructions cause the computing device to:
read the RPS of the next frame to be decoded after a decoding of a current frame to determine whether the current frame is a reference frame to the next frame or other frames;
delay the decoding of the current frame to read the RPS of the next frame;
remove a reference frame from on-chip cache memory depending on the indicator; and
remove a reference frame from on-chip cache memory when a number of the reference frame no longer appears in an RPS after appearing in at least one or more RPSs.

* * * * *